(12) United States Patent
Kotschenreuther et al.

(10) Patent No.: US 8,279,994 B2
(45) Date of Patent: Oct. 2, 2012

(54) TOKAMAK REACTOR FOR TREATING FERTILE MATERIAL OR WASTE NUCLEAR BY-PRODUCTS

(75) Inventors: Michael T. Kotschenreuther, Austin, TX (US); Swadesh M. Mahajan, Austin, TX (US); Prashant M. Valanju, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 770 days.

(21) Appl. No.: 12/249,303

(22) Filed: Oct. 10, 2008

(65) Prior Publication Data

US 2011/0170648 A1 Jul. 14, 2011

(51) Int. Cl.
*H05H 1/12* (2006.01)
*A62B 1/00* (2006.01)
(52) U.S. Cl. ............ 376/173; 376/134; 588/305
(58) Field of Classification Search .......... 376/133, 376/134
See application file for complete search history.

(56) References Cited

U.S. PATENT DOCUMENTS

| | | | |
|---|---|---|---|
| 4,149,931 A | 4/1979 | Christensen | 376/134 |
| 4,252,609 A | 2/1981 | Kerst et al. | 176/9 |
| 4,274,919 A | 6/1981 | Jensen et al. | 376/133 |
| 4,277,306 A | 7/1981 | Ohkawa | 376/135 |
| 4,305,783 A | 12/1981 | Ohkawa | 376/133 |
| 4,330,864 A | 5/1982 | Ohyabu | 376/133 |
| 4,343,760 A | 8/1982 | Luzzi, Jr. | 376/134 |
| 4,370,296 A | 1/1983 | Bussard | |
| 4,663,110 A * | 5/1987 | Cheng | 376/146 |
| H0554 H * | 12/1988 | Dawson et al. | 376/107 |
| 5,116,569 A * | 5/1992 | Kasahara et al. | 420/44 |
| 5,147,596 A | 9/1992 | Weil | 376/134 |
| 5,174,945 A | 12/1992 | Bussard | |
| 5,182,075 A | 1/1993 | Gotoh et al. | 376/134 |
| 5,278,881 A * | 1/1994 | Kato et al. | 376/305 |
| 7,128,980 B2 | 10/2006 | Schedler et al. | 428/553 |
| 2002/0172316 A1 | 11/2002 | Matera et al. | 376/134 |
| 2007/0206716 A1 | 9/2007 | Edwards et al. | 376/121 |

OTHER PUBLICATIONS

Muraviev et al., "Liquid Metal Cooled Divertor for ARIES," GA-A21755, Jan. 1995.
Kotschenreuther et al; Fusion-Fission Hybrids, Maturing of an old idea; Colloquium at International Center for Theoretical Physics (ICTP), Trieste, Aug. 13, 2009, pp. 1-43 (TALK/POSTER37).
Kotschenreuther et al; Divertor issues on FNSF; Talks given at UCLA, Aug. 20-21, 2009, pp. 1-28 (TALK/POSTER38).

(Continued)

*Primary Examiner* — Johannes P Mondt
(74) *Attorney, Agent, or Firm* — Dickinson Wright PLLC

(57) ABSTRACT

Disclosed is a tokamak reactor. The reactor includes a first toroidal chamber, current carrying conductors, at least one divertor plate within the first toroidal chamber and a second chamber adjacent to the first toroidal chamber surrounded by a section that insulates the reactor from neutrons. The current carrying conductors are configured to confine a core plasma within enclosed walls of the first toroidal chamber such that the core plasma has an elongation of 1.5 to 4 and produce within the first toroidal chamber at least one stagnation point at a perpendicular distance from an equatorial plane through the core plasma that is greater than the plasma minor radius. The at least one divertor plate and current carrying conductors are configured relative to one another such that the current carrying conductors expand the open magnetic field lines at the divertor plate.

6 Claims, 21 Drawing Sheets

OTHER PUBLICATIONS

Kotschenreuther et al; Fission-Fusion hybrid—efficient destruction of nuclear waste, From a challenge to an opportunity; Talks given at UCLA, Aug. 20-21, 2009, pp. 1-51 (TALK/POSTER39).

Kotschenreuther et al; Fission-Fusion hybrid—efficient destruction of nuclear waste, From a challenge to an opportunity; Talk given at University of Texas, Austin, TX, Aug. 2009, pp. 1-34 (TALK/POSTER40).

Kotschenreuther et al; Fusion Driver for the University of Texas Hybrid—Compact Fusion Neutron Source (CFNS); Talk given at Department of Energy hybrid workshop, Gaithersburg, Oct. 1, 2009, pp. 1-36 (TALK/POSTER41).

Kotschenreuther et al; An ST fusion neutron driver for fission-fusion hybrid applications; Talk given at workshop at University of Wisconsin, Madison, WI, Oct. 24, 2009, pp. 1-33 (TALK/POSTER42).

Kotschenreuther et al; An CTF fusion neutron driver for fission-fusion hybrid applications; Talk given at American Physical Society meeting, Atlanta, GA, Oct. 31, 2009, pp. 1-31 (TALK/POSTER43).

Kotschenreuther et al; A fission-fusion hybrid for waste transmutation; Talk given at fusion power associates, Talk given at fusion power associates, Dec. 1, 2009, pp. 1-35 (TALK/POSTER44).

Manheimer Fusion Greeders to Fuel Fission Burners, A New (Old) Idea for Fusion Development,GCEP Symposium NOV at MIT, Nov. 29, 2007.

Gerstner, E. "The Hypbid returns." Nature 460:25-28; Jul. 2009.

Wu Y. et al. Conceptual design of the fusion-driven subcritical system FDS-I. Fusion Engineering and Design 81:1305-1311 (Feb. 2006).

Valanju, PM. et al. "Super X divertors and high power density fusion devices." Physics of Plasmas 16,056110-1 (2009).

International Search Report and Written Opinion for International Application No. PCT/US09/54399 date mailed Feb. 4, 2010 (15 Pages).

Lawrence Livermore National Laboratory, Corsica: Integrated Simulations for Magnetic Fusion Energy, Science & Technology Review, May 1998, (2 Pages).

Bethe; *The fusion hybrid—Using fusion reactions for breeding fissile materials in addition to producing electric power may provide us with a safe and economic way to extend our energy resources*; Physics Today, May 1979, pp. 44-51.

Committee on Separations Technology and Transmutation Systems, National Research Council; *Executive Summary*; Nuclear Wastes: Technologies for Separations and Transmutation, 1996, pp. 1-10.

Eckhardt et al.; *Yucca Mountain—Looking then thousand years into the future*; Los Alamos Science, No. 26, 2000, pp. 464-489.

Halsey; *AFCI Repository Impact Evaluation Report Systems Analysis Progress Report—FY03*; AFCI Repository Impact Evaluation Report, Sep. 12, 2003, pp. 1-10.

Von Hippel; *Nuclear Fuel Recycling: More Trouble Than It's Worth*; Scientific America Magazine, Apr. 28, 2008, pp. 1-5.

Kotschenreuther et al.; *On Heat Loading, Divertors and Reactors*; 21$^{st}$ IAEA Conference, Oct. 2006, available at http://www-pub.iaea.org/MTCD/Meetings/FEC2006/ic_p7-12.pdf; pp. 1-8.

Kotschenreuther et al.; *On heat loading, novel divertors, and fusion reactors*; Physics of Plasma, vol. 14, Jul. 9, 2007, pp. 1-25.

Parkins; *Fusion Power: Will it Ever Come?*; Science Magazine, vol. 311, Mar. 10, 2006, pp. 1380.

Rebut; *From JET to the Reactor*, Plasma Physics and Controlled Fusion, vol. 48, Nov. 8, 2006, pp. B1-B13.

F. L. Ribe; *Fusion Reactor Systems*; Reviews of Modern Physics, vol. 47, No. 1, Jan. 1975, pp. 7-41, plus 6 pages of figures.

Stacey; *Tokamak D-T fusion neutron source requirements for closing the nuclear fuel cycle*; Nuclear Fusion, vol. 47, Feb. 26, 2007, pp. 217-221.

Steiner et al.; *The Aries Fusion Neutron-Source Study*, Final Report: The Aries Neutron Source Study, Aug. 2000, pp. 1-46.

Takenaga et al.; *Relationship between particle and heat transport in JT-60U plasmas with internal transport barrier*, Nuclear Fusion, vol. 43, Oct. 2, 2003, pp. 1235-1245.

Wilson et al.; *A Steady State Spherical Tokamak for Components Testing*; 20$^{th}$ IAEA Fusion Energy Conference, Preprint FT/3-1Ra, Nov. 2004, available at http://www-pub.iaea.org/MTCD/Meetings/Announcements.asp?ConfID=116; pp. 1-8.

Ikeda; *Preface—Progress in the ITER Physics Basis*; Nuclear Fusion vol. 47, No. 6, Jun. 2007, pp. 1-2.

Shimada et al.; *Chapter 1: Overview and summary*, Nuclear Fusion vol. 47, No. 6, Jun. 2007, pp. S1-S17.

Doyle et al.; *Chapter 2: Plasma confinement and transport*; Nuclear Fusion vol. 47, No. 6, Jun. 2007, pp. S18-S127.

Hender et al.; *Chapter 3: MHD stability, operational limits and disruptions*; Nuclear Fusion vol. 47, No. 6, Jun. 2007, pp. S128-S202.

Loarte et al.; *Chapter 4: Power and particle control*; Nuclear Fusion vol. 47, No. 6, Jun. 2007, pp. S203-S263.

Fasoli et al.; *Chapter 5: Physics of energetic ions*; Nuclear Fusion vol. 47, No. 6, Jun. 2007, pp. S264-S284.

Gormezano et al.; *Chapter 6: Steady State Operation*; Nuclear Fusion vol. 47, No. 6, Jun. 2007, pp. S285-S336.

Donne et al.; *Chapter 7: Diagnostics*; Nuclear Fusion vol. 47, No. 6, Jun. 2007, pp. S337-S384.

Gribov et al.; *Chapter 8: Plasma operation and control*; Nuclear Fusion vol. 47, No. 6, Jun. 2007, pp. S385-S403.

Mukhovatov et al.; *Chapter 9: ITER contributions for Demo plasma development*; Nuclear Fusion vol. 47, No. 6, Jun. 2007, pp. S404-S413.

Perkins et al.; *Chapter 1: Overview and summary*, Nuclear Fusion vol. 39, No. 12, Dec. 1999, pp. 2137-2174.

Wakatani et al.; *Chapter 2: Plasma confinement and transport*, Nuclear Fusion vol. 39, No. 12, Dec. 1999, pp. 2175-2249.

Mirnov et al.; *Chapter 3: MHD stability, operational limits and disruptions*; Nuclear Fusion vol. 39, No. 12, Dec. 1999, pp. 2251-2389.

Stambaugh et al.; *Chapter 4: Power and particle control*; Nuclear Fusion vol. 39, No. 12, Dec. 1999, pp. 2391-2469.

Jacquinot et al.; *Chapter 5: Physics of energetic ions*; Nuclear Fusion vol. 39, No. 12, Dec. 1999, pp. 2471-2495.

Jacquinot et al.; *Chapter 6: Plasma auxiliary heating and current drive*; Nuclear Fusion vol. 39, No. 12, Dec. 1999, pp. 2495-2539.

Young et al.; *Chapter 7: Measurement of plasma parameters*; Nuclear Fusion vol. 39, No. 12, Dec. 1999, pp. 2541-2575.

Mirnov et al.; *Chapter 8: Plasma operation and control*; Nuclear Fusion vol. 39, No. 12, Dec. 1999, pp. 2577-2625.

Perkins et al.; *Chapter 9: Opportunities for reactor scale experimental physics*; Nuclear Fusion vol. 39, No. 12, Dec. 1999, pp. 2627-2638.

Krushelnick et al.; *Reduced Turbulence and New Opportunities for Fusion*; Science Magazine, vol. 309, Feb. 9, 2005, pp. 1502-1503.

Metz; *Fusion Research (I): What Is the Program Buying the Country?*; Science Magazine, vol. 192, Jun. 25, 1976, pp. 1320-1323.

Metz; *Fusion Research (II): Detailed Reactor Studies Identify More Problems*; Science Magazine, vol. 193, Jul. 2, 1976, pp. 38-40, 76.

Post et al.; *Fusion Reactors as Future Energy Sources*; Science Magazine, vol. 186, Jan. 11, 1974, pp. 397-407.

Valanju et al.; *Super X divertors for solving heat and neutron flux problems of fusion devices*; Fusion Engineering and Design, Jun. 2009, pp. 1-7.

Valanju et al., *Novel Magnetic Geometrics to Cure the Divertor Heat Flux Problem for Reactors*, APS-DPP Meeting 2004, 30 pages.

Kotschenreuther et al., *High Power Density (HPD) Fusion Machine Prelude to HPD Reactors*, Institute for Fusion Studies, Feb. 6, 2008, pp. 1-30.

Kotschenreuther et al., *High Power Density Experiment (HPDX)*, Institute for Fusion Studies, Feb. 14, 2008, 26 pages.

Valanju et al., *Super X Divertor (SXD), and High Power Density Experiments*, Institute for Fusion Studies, Sherwood Meeting, Mar. 31, 2008, 30 pages.

Kotschenreuther et al., *Why Fusion May be Important Surprisingly Soon—because it could come to the aid of fission energy*, Institute for Fusion Studies, May 6, 2008, 12 pages.

Kotschenreuther et al., *Fusion May be Important Soon It can critically aid fission energy*, Institute for Fusion Studies, May 23, 2008, 12 pages.

Valanju et al., *Super X Divertors for FDF*, Institute for Fusion Studies, FDF Workshop, GA, Jun. 3, 2008, 15 pages.

Kotschenreuther et al., *Fusion-Fissino hybrid devices—Fusino with a new magnetic bottle to assist fission energy*, Institute for Fusion Studies, Jun. 13, 2008, 16 pages.

Valanju et al., *Super X Divertor for NSTX*, Institute for Fusion Studies, PPPL, Jun. 18, 2008, 20 pages.

Notice of Abandonment mailed Sep. 21, 2010 (U.S. Appl. No. 12/197,736).

Response to Election/Restriction mailed Oct. 7, 2009 (U.S. Appl. No. 12/197,736).

Requirement for Restriction/Election mailed Jul. 9, 2009 (U.S. Appl. No. 12/197,736).

International Search Report for International Application No. PCT/US09/055682 mailed Aug. 30, 2010.

International Search Report and Written Opinion for International Application No. PCT/US09/059763 mailed Sep. 7, 2010.

International Search Report and Written Opinion for International Application No. PCT/US09/064166 mailed Aug. 30, 2010.

Baetsle, L.H. "Burning of actinides: a complementary waste management option?" IAEA Bulletin, 34(3):32-24 (1992).

Kelly et al. "The tokamak hybrid reactor." Nuclear Eng. and Design 63(2):395-421 (Mar. 1981).

Peng Y-K M et al. "Spherical tokamak (ST) transmutation of nuclear wastes." 16th IEEE/NPSS Smyposium Fusion Engineering, SOFE '95. Seeking a new energy ERA IEEE New York NY USA 2:1423-1429 (1995).

Schultz, K.R. "Material implications of fusion-fission reactor designs." Proceedings of the First Topical Meeting on Fusion Reactor Materials Jan. 29-31, 1979, Miami Beach, FL, USA; J. of Nuc. Materials. 85-6:29-36 (Dec. 1979).

Schultz, K.R. "A review of hybrid reactor fuel cycle considerations." Transactions of the American Nuclear Society 27:344-345 (Dec. 1977).

Varjen et al. "DTHR and CTHR: A review of two recent Tokamak fusion-fisson hybrid reactor design studeis." Fusion Reactor Design and Technology—Proceedings of the 3rd Technical Committee Meeting and Workshop Oct. 5-16 Tokyo Japan (vol. 1, pp. 529-543) (1981).

Wu Y. et al. Waste Transmutation and nuclear energy generation using a tokamak fusion-fission hybrid reactor,) High Technol. Letters (English Lang. Ed.) vol. 1, No. 1, pp. 82-86 (Jun. 1995).

Yapichi et al. "Time-dependent neutronic analysis for high level waste transmuter." J. Fusion Energy 27(3):207 (parg.1)-208 (last parg.), published online Nov. 2, 2007.

Kotschenreuther et al; "Super" Divertors—imperative for next step advanced tokamak burning plasmas, Super X-divertor Necessary—not merely advantageous; American Physical Society Division of Plasma Physics Meeting, Nov. 13, 2007, pp. 1-39 (TALK/POSTER1).

Kotschenreuther et al; High Power Density (HPD) Fusion Machine Prelude to HPD Reactors. Vision and a Possible Pathway (and an opportunity for SST), Principal Actor Super X-divertor; Colloquium at Institute for Plasma Research, Feb. 6, 2008, pp. 1-30 (TALK/POSTER2).

Kotschenreuther et al; High Power Density Experiment (HPDX), A Next Step device for US leadership in the age of ITER; Presentation at MIT, Feb. 13, 2008, pp. 1-29 (TALK/POSTER3).

Kotschenreuther et al; An Opportunity and a Vision for US leadership in the age of ITER, High Power Density Experiment (HPDX); Presentation at Department of Energy, Washington D.C., Mar. 13, 2008, pp. 1-41 (TALK/POSTER4).

Kotschenreuther et al; An Opportunity and a Vision for US leadership in the age of ITER, High Power Density Experiment (HPDX); Washington, D.C., Apr. 22, 2008, pp. 1-40 (TALK/POSTER5).

Kotschenreuther et al; How Could Fusion Help the Global Nuclear Energy Partnership?; Presentation at UT, Apr. 23, 2008, pp. 1-8 (TALK/POSTER6).

Kotschenreuther et al; Why Fusion May be Important Surprisingly Soon—because it could come to the aid of fission energy; Presentation at UT, May 5, 2008, pp. 1-11 (TALK/POSTER7).

Kotschenreuther et al; Fusion May be Important Soon, It can critically aid fission energy; Presentation at UT, May 23, 2008, pp. 1-12 (TALK/POSTER8).

Kotschenreuther et al; Super X Divertors for FDF; Presentation at General Atomics, Jun. 3, 2008, pp. 1-15 (TALK/POSTER9).

Kotschenreuther et al; The Super X divertor to handle the enormous divertor challenge of next step devices; Presentation at Princeton Plasma Physics Laboratory (PPPL), Jun. 19, 2008, pp. 1-34 (TALK/POSTER10).

Kotschenreuther et al; Fusion-Fission hybrid devices, Fusion with a new magnetic bottle to assist fission energy; Presentation at University of Texas, Jun. 13, 2008, pp. 1-16 (TALK/POSTER11).

Kotschenreuther et al; New Fusion-Fission hybrid, Nuclear waste-burner plus carbon free energy source; Presentation at University of Texas, Aug. 25, 2008, pp. 1-37 (TALK/POSTER12).

Kotschenreuther et al; New Fusion-Fission Hybrid, Nuclear Fission Waste Burner; Presentation in Washington D.C., Sep. 15, 2008, pp. 1-17 (TALK/POSTER13).

Kotschenreuther et al; New Fusion-Fission hybrid, Nuclear waste-burner plus Carbon Free Energy Source; Presentation at UT, Sep. 16, 2008, pp. 1-8 (TALK/POSTER14).

Kotschenreuther et al; Super X Divertor (SXD) and High Power Density Devices; Presentation at UT Fusion Research Center, Austin, TX, Oct. 3, 2008, pp. 1-19 (TALK/POSTER15).

Kotschenreuther et al; Super X Divertor (SXD) and High Power Density Devices; Presentation at International Atomic Energy Agency Meeting, Geneva, Switzerland, Oct. 11, 2008, pp. 1-23 (TALK/POSTER16).

Prashant Valanju; Super X Divertor (SXD) and High Power Density; Talk at the 50th Annual Meeting of the Division of Plasma Physics, Dallas, TX, Nov. 20, 2008, pp. 1-20 (TALK/POSTER17).

Kotschenreuther et al; "Waste-Free" Nuclear Energy, Fusion-Fission Hybrid; UT Physics Colloquium, Dec. 3, 2008, pp. 1-30 (TALK/POSTER18).

Kotschenreuther et al; Transmutation methods—background, Overview of UT developed method, Compact Fusion Neutron Source for Transmutation; Talks at Oak Ridge National Lab, Dec. 8-9, 2008, pp. 1-27 (TALK/POSTER19).

Kotschenreuther et al; Efficient Destruction of Nuclear Waste; Presentations at Department of Energy, Washington D.C., Jan. 9, 2009, pp. 1-34 (TALK/POSTER20).

Kotschenreuther et al; Nuclear aspects of the Fusion-Fission Hybrid; Talk at UT Physics Building, Feb. 6, 2009, pp. 1-40 (TALK/POSTER21).

Kotschenreuther et al; Fission-Fusion Hybrids for Efficient Destruction of Nuclear Waste; Presentation at MIT, Mar. 6, 2009, pp. 1-65 (TALK/POSTER22).

Kotschenreuther et al; Fusion-Assisted Efficient Destruction of Nuclear Waste, Helping nuclear renaissance; Presentation given to members of National Instruments, Austin, TX, Mar. 18, 2009, pp. 1-13 (TALK/POSTER23).

Kotschenreuther; US hybrids—Past and Present; Presentation given at University of Maryland, Apr. 1, 2009, pp. 1-38 (TALK/POSTER24).

Kotschenreuther et al; Fission-Fusion hybrid to destroy nuclear waste, From a challenge to an opportunity; Presentation given at Princeton Plasma Physics Laboratory, Apr. 30, 2009, pp. 1-47 (TALK/POSTER25).

Kotschenreuther et al; Fusion-fueled Nuclear Renaissance, Waste Destruction, Fuel production, Energy security, US leadership in matters nuclear; Presentation given at Ben Barnes Office, Austin, TX, May 11, pp. 1-19 (TALK/POSTER26).

Kotschenreuther et al; Fission-Fusion hybrid—efficient destruction of nuclear waste, From a challenge to an.opportunity; Presentation given at Department of Energy Sandia National Lab, Albuquerque, NM, May 13, 2009, pp. 1-43 (TALK/POSTER27).

Kotschenreuther et al; Fission-Fusion hybrid—efficient destruction of nuclear waste, From a challenge to an opportunity; Presentation given at American Physical Society meeting, Denver, CO, May 5, 2009, pp. 1-40 (TALK/POSTER28).

Kotschenreuther et al; Fusion Drivers for hybrids—From a challenge to an opportunity; Presentation given in Denver, May 5, 2009, pp. 1-35 (TALK/POSTER29).

Kotschenreuther et al; Devising a fuel cycle for a hybrid which gives it decisive advantage; Presentation given in Denver, May 5, 2009, pp. 1-15 (TALK/POSTER30).

Kotschenreuther et al; Divertor issues on next step devices, and the Super-X divertor; Talk given at Oak Ridge National lab, Oak Ridge, TN, Jun. 19, 2009, pp. 1-19 (TALK/POSTER31).

Kotschenreuther et al; Divertor issues on next step devices, and the Super-X Divertor (SXD); Talk given electron to Culham, Great Britain, Jun. 21, 2009, pp. 1-24 (TALK/POSTER32).

Kotschenreuther et al; Fission-Fusion hybrids—potential advantages for nuclear waste destruction; Talk given to Idaho National Engineering Laboratory, Jul. 10, 2009, pp. 1-61 (TALK/POSTER33).

Kotschenreuther et al; Overview of the High Support Ratio Fusion-Fission Hybrid System: Fusion; Talks given at University of Texas workshop, Austin, TX, Aug. 2, 2009, pp. 1-36 (TALK/POSTER34).

Schneider; Overview of the High Support Ratio Fusion-Fission Hybrid System~Fission; Talks given at University of Texas workshop, Austin, TX, Aug. 3, 2009, pp. 1-35 (TALK/POSTER35).

Kotschenreuther et al; A Compact Fusion Neutron Source for Efficient Nuclear Waste Incineration; Presentation given at University of Texas, Austin, TX, Aug. 7, 2009, pp. 1-22 (TALK/POSTER36).

\* cited by examiner

Provide Reactor Comprising
A First Chamber Comprising
A Plasma For Producing High Power
Density Neutrons Provide Neutrons From The Plasma In
The First Chamber To A Fertile Material
In A Second Chamber, Thereby Converting
At Least A Portion Of The Fertile Material
To Fissile Material Optionally Fission The Fissile Material,
Thereby Providing Usable Energy

FIG.5A

Substantially Magnetically Contain A
Fusion Plasma In a Toroidal Chamber
Having An Inner Radius And An Outer
Radius Relative To A Central Axis Direct Particles From The Fusion
Plasma To A Divertor Plate Having A
Divertor Radius Relative To The
Central Axis That Is Greater Than Or
Equal To The Outer Radius Of The
Toroidal Chamber Provide Neutrons From The Core
Plasma To A Second Chamber
Comprising A Fertile Material
Positioned Substantially
Adjacent to At Least A Portion Of The
Core Plasma Such That The Fertile
Material Is Converted To Fissile Material

FIG.5B

A Toroidal Core Plasma Is Substantially Confined Within A Toroidal Chamber By Magnetic Field Lines That Stay Substantially On Closed Toroidal Magnetic Surfaces. The Magnetic Field Lines Are Created By Currents In The Core Plasma And In Current Carrying Conductors Substantially Adjacent To The Toroidal Chamber. The Toroidal Core Plasma Is Substantially Enclosed By A Region Of Open Magnetic Field Lines That Intersect One Or More Divertor Plates.

Particles Are Directed From The Toroidal Core Plasma That Cross Closed Magnetic Surfaces To The Open Magnetic Field Lines To The One Or More Divertor Plates. At Least One of The One Or More Divertor Plates Is Placed At An Outboard Divertor Major Radius That Is Greater Than Or Equal To A Sum Of A Plasma Minor Radius And A Major Radius Of The Peak Point Closest To The Corresponding Divertor Plate Provide Neutrons From The Core Plasma To A Layer Of Fertile Materials Positioned Substantially Adjacent To At Least A Portion Of The Core Plasma Such That At Least A Portion Of The Fertile Material Is Converted Into Fissile Material

FIG.5C

```
┌─────────────────────────────────────────────────┐
│  A First Chamber Is Provided, The First Chamber Is │
│      Enclosed By Walls About A Central Axis     │
│                      502                        │
└─────────────────────────────────────────────────┘
                         │
┌─────────────────────────────────────────────────┐
│  A High Power Density Neutron Source Is Contained │
│            Within The First Chamber             │
│                      504                        │
└─────────────────────────────────────────────────┘
                         │
┌─────────────────────────────────────────────────┐
│  Fertile Material Is Placed In A Second Chamber That │
│  Is Substantially Adjacent To At Least A Portion Of │
│              The First Chamber                  │
│                      506                        │
└─────────────────────────────────────────────────┘
                         │
┌─────────────────────────────────────────────────┐
│ Neutrons From The High Power Density Neutron Source │
│  Convert At Least A Portion of The Fertile Material To │
│              Fissile Materials                  │
│                      508                        │
└─────────────────────────────────────────────────┘
```

FIG.5D

NHTX SXD (Corsica Equilibrium)

SOLPS SXD Calculation

NHTX Standard Divertor

TOKAMAK REACTOR FOR TREATING FERTILE MATERIAL OR WASTE NUCLEAR BY-PRODUCTS This invention was made with U.S. government support under Grant Nos. DE-FG02-04ER54742 and DE-FG02-04ER54754 awarded by the United States Department of Energy. The U.S. government has certain rights in the invention.

BACKGROUND

Global warming is a pressing, potentially disastrous problem for humanity. This has created a need for energy sources that do not emit greenhouse gasses, and that could supplant a substantial fraction of carbon-based energy supply on a relatively short time scale. Nuclear power that utilizes existing technology to provide the required amount of energy in a reasonable period of time, has been increasingly advocated as one strategy to combat global warming.

While renewable energy sources are advocated, their current state of development and intermittent nature limit the amount of energy they can supply. In terms of nuclear energy, since there is only a limited natural supply of fissionable isotopes from which usable energy can be derived, reactors that produce neutrons are required to convert fertile material to fissile material through a process known as breeding. However, current reactors are limited by the power density of neutrons they can supply. Oftentimes, because of these limitations, nuclear fuel breeding processes are extremely inefficient, and as such, require vast amounts fertile material to provide sufficient amounts of fissile material. Such low yields create further challenges, such as nuclear waste management and weapons proliferation control. In addition, because of low yielding reactors, many fuel supplying reactors are needed to supply fission reactors, leading again to many of the aforementioned challenges. It has been suggested that nuclear fusion reactors could supply the large number of neutrons to breed nuclear fuel for fission reactors. However, currently, nuclear fusion technology is insufficient for practically supplying enough nuclear fuel to fission reactors for usable energy production. In theory, however, nuclear fusion can potentially offer a practical approach to nuclear fuel supply.

Nuclear fusion is a source of neutrons and energy derived from nuclear combinations of light elements into heavier elements resulting in a release of energy. In fusion, two light nuclei (such as deuterium and tritium) combine into one new nucleus (such as helium) and release enormous energy and another particle (such as a neutron in the case of the fusion of deuterium and tritium) in the process. Nuclear fusion is more neutron-rich energy source than fission. While fusion is a spectacularly successful energy source for the sun and the stars, the practicalities of harnessing fusion on Earth are technically challenging, given that to sustain fusion, a plasma (a gas consisting of charged ions and electrons), or an ionized gas, has to be confined and heated to millions of degrees Celsius in a fusion reactor for a sufficient period of time to enable the fusion reaction to occur. The science behind fusion is well advanced, rooted in more than 100 years of nuclear physics and electromagnetic and kinetic theory, yet current engineering constraints make the practical use of nuclear fusion as a direct energy source very challenging. One approach to fusion reactors uses a powerful magnetic field to confine plasma, thereby releasing fusion energy in a controlled manner. To date, the most successful approach for achieving controlled fusion is in a donut-shape or toroidal-shape magnetic configuration called a tokamak. While a tokamak can, in principle, be used as a source of the fast neutrons needed breeding fissile materials, the current art of fusion reactors limits tokamaks to power densities that are far too low (by factors of 5 or more) for this purpose.

With current tokamak technology, the confinement of plasma to produce nuclear fusion reactions can be accomplished with a magnetic field (i.e., a magnetic bottle) created inside a vacuum chamber of a fusion reactor. Since the plasma is ionized, plasma particles tend to gyrate in small orbits around magnetic field lines, i.e., they essentially stick to the magnetic field lines, while flowing quite freely along the field lines. This can be used to "suspend" bulk plasma in the vacuum chamber by using a properly designed magnetic field configuration, which is sometimes called a magnetic bottle. The plasma can be magnetically contained within the chamber by creating a set of nested toroidal magnetic surfaces by driving an electric current in the plasma, and by the placement of current-carrying coils or conductors adjacent to the plasma. Since magnetic field lines on these magnetic surfaces do not touch any material objects such as walls of the vacuum chamber, the very hot plasma can ideally remain suspended in the magnetic bottle, i.e., in the volume containing closed magnetic surfaces, for a long time, without the particles coming into contact with the walls. However, in reality, particles and energy very slowly escape magnetic confinement in a direction perpendicular to the magnetic surfaces as a result of particle collisions with one another or turbulence in the plasma. Decreasing this slow plasma loss, so that the particles and energy of the plasma are better confined, has been a fundamental focus of plasma confinement research.

The boundary of the magnetic bottle containing closed magnetic surfaces, i.e., the "core plasma", is defined by either material objects called limiters (e.g., 610 with reference to FIG. 6), or by a toroidal magnetic surface called a separatrix (e.g., 630 with reference to FIG. 6), outside of which the magnetic field lines are "open", i.e., they terminate on material objects called divertor targets (e.g., 620 with reference to FIG. 6). The particles and energy slowly escaping the core plasma mainly fall on small areas of either limiter or divertor targets and generate impurities. Since limiters are right at the plasma boundary, while divertor targets can be placed farther away, core plasma can be better isolated from such impurities by using divertors. Since the invention of divertors, the preferred mode of plasma operation has been to have a separatrix and a divertor, since such operation has been found to enable a mode of operation called the H-mode, where the plasma particles and energy in the core are better confined.

Since particles flow very fast along magnetic lines but very slow across them, any particles and energy that escape across the separatrix reach divertor targets quickly along open field lines before moving much across them. This creates a necessarily narrow "scrape-off layer" with a high "scrape off flux" of particles and energy that falls on narrow areas of the divertor plates. The maximum "scrape off flux" that a divertor can handle limits the highest power density that can be sustained in a magnetic bottle.

High "scrape off flux" creates a multitude of challenges. In addition to heat and particle fluxes, the divertor plates also have to withstand large fluxes of neutrons created in fusion. These neutrons cause a degradation of many important material properties, making it extremely difficult for a divertor plate to handle both the high heat fluxes and neutron fluxes without having to be replaced frequently. Periodically replacing the damaged components is very time consuming and requires the fusion reaction to be shut off. Further, trying to reduce the "scrape off flux" by injecting impurities to radiate energy before it reaches divertor plates is not workable because the density of power coming out of the plasma becomes so high that it seriously degrades the plasma confinement, which results in a serious reduction of the fusion reaction rate in the core plasma.

To lower neutron and heat fluxes on a divertor and thus mitigate the damage to a divertor component, a reactor could simply be made larger to decrease the density of power within a device. However, this approach significantly increases the reactor cost, and hence the cost of any energy produced with it, to levels that are economically non-competitive with other methods for the generation of power or neutrons.

A high level of "scrape off flux" is a critical roadblock for many fusion applications, including nuclear fuel breeding. For example, for fusion reactors of sizes that can make them economically competitive with other methods of energy production, the high "scrape off flux" is intolerable for divertor designs based on current art. One way of handling challenges presented by high scrape off flux and enabling compact high-power density fusion neutron sources is described in U.S. patent application Ser. No. 12/197,736 to Kotschenreuther, et al, filed Aug. 25, 2008, fully incorporated herein by reference and made a part hereof.

Therefore, there remains a need for improved nuclear fusion reactors to provide sufficient flux and fluence (i.e., time-integrated flux) of fast neutrons with sufficient energy to breed nuclear fuel from fertile material so as to effectively overcome challenges in the current art, some of which are mentioned above.

SUMMARY

Disclosed herein are embodiments of systems and methods for breeding nuclear fuel. Also disclosed are methods and nuclear fuel cycles for producing fissile material using a disclosed embodiment, and optionally using said fissile material in energy production methods. The various embodiments described herein can be useful in applications that desire the production of a fissile material, or the subsequent uses thereof.

In one aspect, a reactor for breeding nuclear fuel comprises a first chamber enclosed by walls about a central axis. The first chamber can enclose a plasma having a plasma major radius, relative to the central axis, and a total heating power (i.e., heating power from all sources). In one aspect, the total heating power divided by the plasma major radius is about 30 megawatts per meter or higher. The reactor also comprises a second chamber enclosing a fertile material. The second chamber is generally positioned adjacent to the first chamber, such that neutrons can be provided to the fertile material in the second chamber from the plasma in the first chamber. In a further aspect, a reactor can be part of a series of reactors, including, for example, one or more thermal-spectrum reactors.

Also provided are methods for breeding nuclear fuel using a disclosed reactor, and optionally extracting usable energy from the nuclear fuel. In one aspect, a method for breeding fissile nuclear fuel comprises providing neutrons from a plasma in a disclosed reactor to a fertile material with a neutron power density sufficient to convert at least a portion of the fertile material to a fissile nuclear fuel.

In another aspect, methods for energy production are disclosed. A method for energy production can comprise breeding a fissile nuclear fuel using a source reactor and subsequently supplying the fissile nuclear fuel to one or more thermal-spectrum reactors. The thermal-spectrum reactors can then optionally provide usable energy from the fissile nuclear fuel.

Additional advantages will be set forth in part in the description which follows, and in part will be obvious from the description, or may be learned by practice. Other advantages will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, not necessarily drawn to scale, which are incorporated in and constitute a part of this specification, illustrate several embodiments and together with the description serve to explain the principles of the invention, and in which:

FIGS. 5A-5E show flow charts for methods for breeding nuclear fuel and methods for energy production using disclosed embodiments;

DETAILED DESCRIPTION

Figure 1:
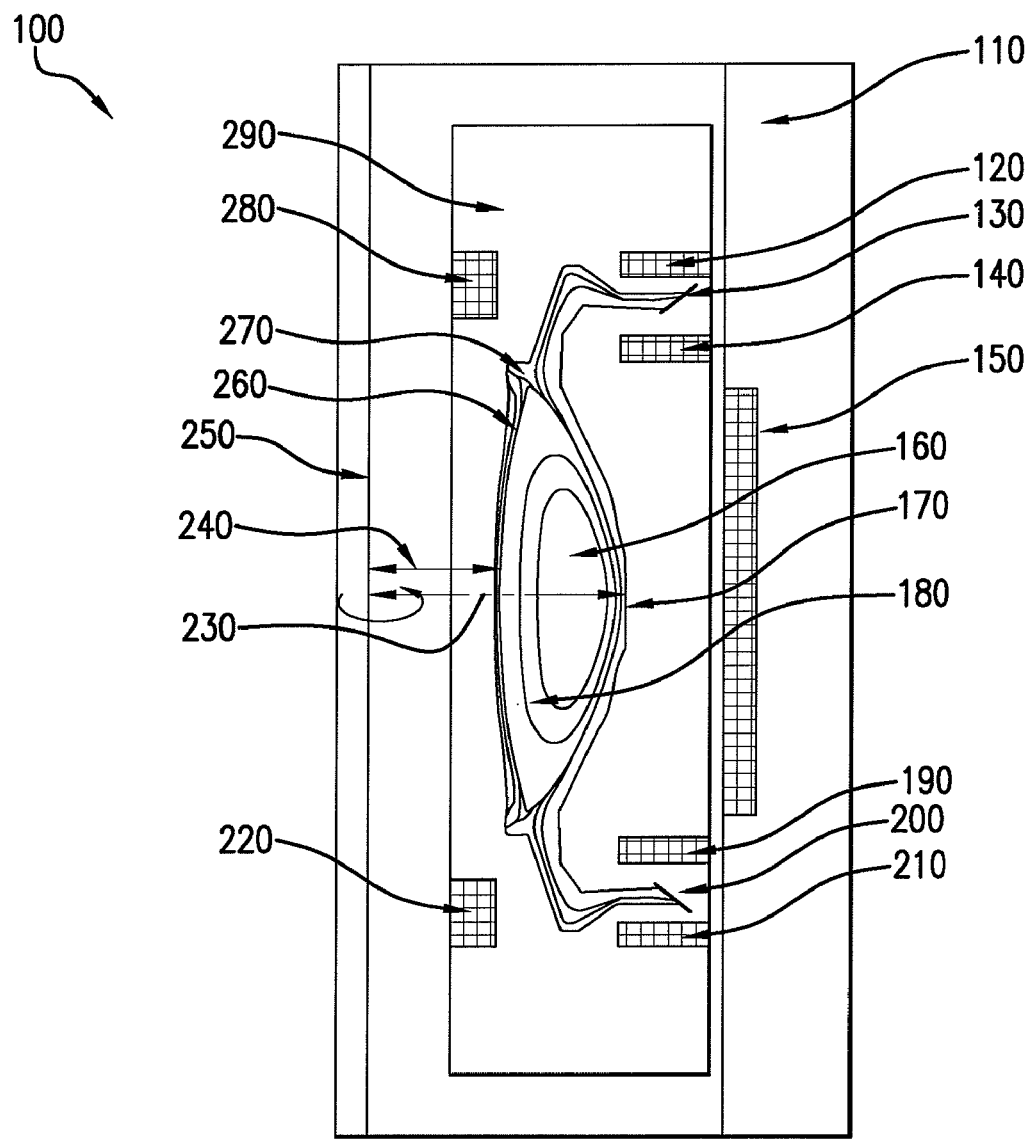
FIG. 1 shows a cross-sectional view of a disclosed embodiment of a reactor.

The devices, systems and methods described herein may be understood more readily by reference to the following detailed description and the examples included therein and to the figures and their previous and following description.

Before the present systems, articles, devices, and/or methods are disclosed and described, it is to be understood that this invention is not limited to specific systems, specific devices, or to particular methodology, as such may, of course, vary. It is also to be understood that the terminology used herein is for the purpose of describing particular embodiments only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the embodiments of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Although any methods and materials similar or equivalent to those described herein can be used in the practice or testing of the present invention, example methods and materials are now described.

Throughout this application, various publications are referenced. Unless otherwise noted, the disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which may need to be independently confirmed.

As used in the specification and the appended claims, the singular forms "a," "an" and "the" include plural referents unless the context clearly dictates otherwise. Thus, for example, reference to "a divertor plate," "a reactor," or "a particle" includes combinations of two or more such divertor plates, reactors, or particles, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

As used herein, the terms "optional" or "optionally" means that the subsequently described aspect may or may be present or that the subsequently described event or circumstance may or may not occur, and that the description includes instances where said event or circumstance occurs and instances where it does not. For example, a disclosed embodiment can optionally comprise a fusion plasma, i.e., a fusion plasma can or cannot be present.

"Exemplary," where used herein, means "an example of" and is not intended to convey a preferred or ideal embodiment. Further, the phrase "such as" as used herein is not intended to be restrictive in any sense, but is merely explanatory and is used to indicate that the recited items are just examples of what is covered by that provision.

Disclosed are the components to be used to prepare the compositions as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of components A, B, and C are disclosed as well as a class of components D, E, and F and an example of a combination component, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions. Thus, if there are a variety of additional steps that can be performed it is understood that each of these additional steps can be performed with any specific embodiment or combination of embodiments of the methods.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Disclosed are reactors for breeding nuclear fuel, vessels for containing plasma or fusion plasma, fusion neutron sources, and tokamaks, wherein a reactive plasma can optionally be present therein; and wherein a fertile material is substantially adjacent to at least a portion of said plasma or a chamber for confining said plasma. Also disclosed are methods of converting the fertile material to fissile material using a disclosed embodiment, wherein a reactive plasma is present. Also disclosed are nuclear fuel cycles for breeding nuclear fuel, which can be used to extract usable energy. Further disclosed are reactor networks, comprising a disclosed embodiment and one or more thermal-spectrum reactors.

Figure 2:
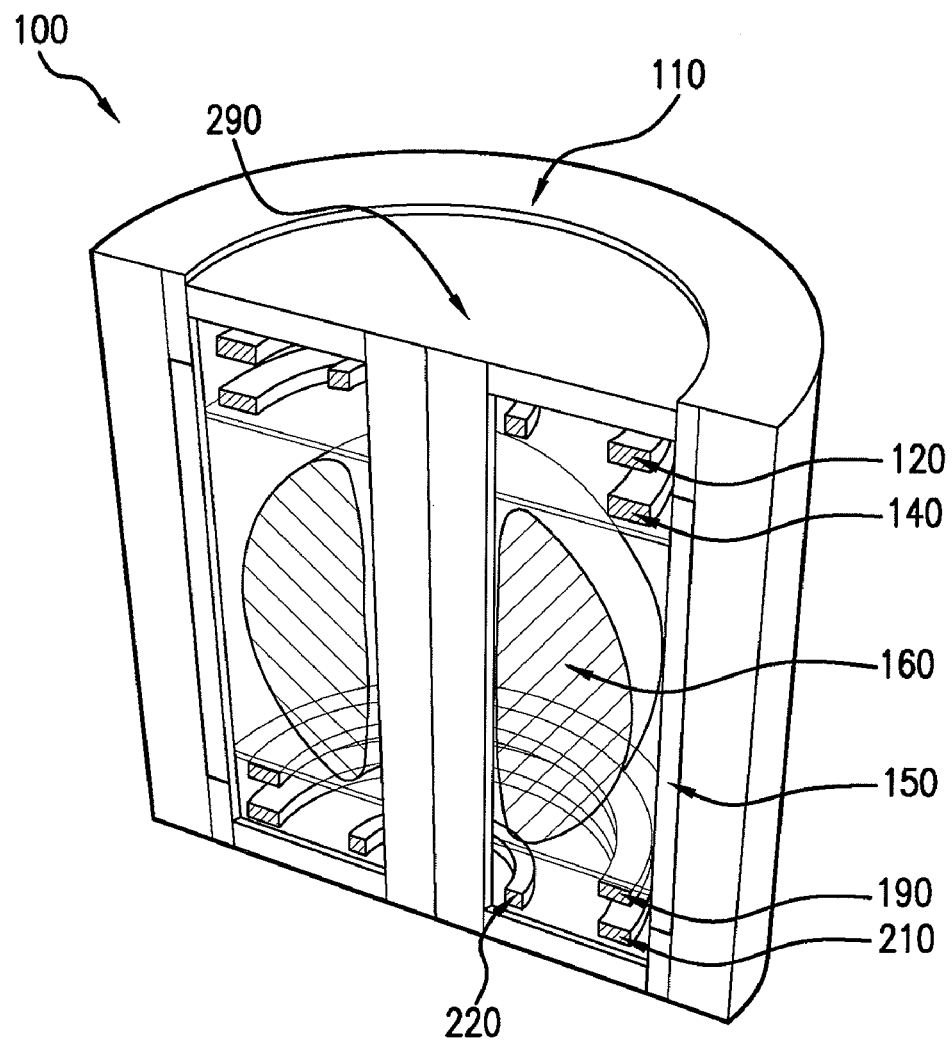
FIG. 2 shows a three dimensional views of the disclosed embodiment shown in FIG. 1.

As an example, a disclosed embodiment can have a general configuration as shown in FIG. 1 and FIG. 2, which is a cross-sectional and perspective view of one half of a disclosed reactor 100. As shown in FIG. 1, a disclosed embodiment can comprise a first chamber substantially enclosed by walls 170 about a central axis 250. The chamber walls have an inner radius 240 that is closest to the central axis 250 and an outer radius 230 that is farthest from the central axis 250. The first chamber can optionally comprise a high power density neutron source (e.g., a core plasma) 160 that, when present, can be contained within said first chamber by closed magnetic surfaces 180 and open magnetic field lines 260 relative to the core plasma. The core plasma can produce fast (about 14 million electron volts) neutrons via fusion reactions, which, since uncharged, can travel away from the core plasma on a given trajectory. The neutrons, when present, can bombard fertile material 150 present in a second chamber substantially adjacent to at least a portion of the first chamber walls 170. Optionally, to insulate the reactor from neutrons, portions of the reactor can comprise Pb sections 290. In addition, a Pb sheath 110 can substantially surround the fertile material in the second chamber 150. The open 260 and closed 180 magnetic field lines can be created by a current induced by current-carrying conductors, including, without limitation, toroidal field (TF) coils 280 and 220 as well as poloidal field (PF) coils 120, 140, 190, and 210. A main boundary or separatrix 270 can exist between open 260 and closed 180 magnetic field lines, i.e., the boundary between opened and closed magnetic drift trajectory. Particles, heat, and/or energy that cross the closed magnetic surfaces 180 (i.e., cross-field flux) can be directed to one or more divertor plates 130 and 200 by the open magnetic field lines 260.

In one aspect, a high power density neutron source can be a core plasma or fusion plasma that emits neutrons from the plasma such that the fertile material absorbs said neutrons and converts, at least partially, into fissile material. In one aspect, such a reaction of the fissionable materials can transmute said fertile material to fissile material (i.e., through neutron absorption). Such fissile material can optionally be further fissioned to produce usable energy.

In a further aspect, a plasma substantially confined within the first chamber can have a total heating power, i.e., heating power from all sources including both external and thermonuclear, such that the total heating power divided by the plasma major radius is 30 megawatts per meter per second or higher. In a still further aspect, a substantially confined plasma can produce an averaged total neutron power equal to about 0.1 megawatts per meter squared per second or higher, crossing the surface of the plasma. By "averaged total neutron power," it is meant that the neutron power of a reactor can be averaged over a period of time to provide an averaged power. For example, a disclosed total neutron power can, in one aspect, refer to the total neutron power averaged over a one year period. In other aspects, the averaged period can be less than one year.

In one aspect, a disclosed embodiment can be used in an open or closed nuclear fuel cycle. In what is commonly referred to as a front-end step, nuclear fuel can be produced using a high power density neutron source that converts fertile material into fissile material. The fissile material can then be further fissioned to extract usable energy, during what is referred to as a service period. If the service period step is the last step of the fuel cycle, then the fuel cycle is an open closed cycle. However, it will be apparent that further steps can be carried out during a back-end step, wherein products, waste, and the like from the service period are further processed. If further steps are taken to back-recycle the products from the service period, then the fuel cycle is a closed fuel cycle. For example, in one embodiment, by-products from the service period can be recycled to a disclosed fusion reactor, and the waste can be transmuted into benign material, such as through embodiments and methods disclosed in U.S. patent application Ser. No. 12/208,532 to Kotschenreuther, et al, filed Sep. 11, 2008, fully incorporated herein by reference and made a part hereof. It will be apparent that using a disclosed embodiment, either an open or closed fuel cycle can be implemented.

In a still further aspect, fissile material originating from a disclosed reactor (i.e., a bred nuclear fuel) can be transferred to one or more thermal-spectrum reactors (e.g., a light water reactor (LWRs)) or other reactors capable of fissioning the fissile material to extract usable energy. In one aspect, a disclosed reactor can singularly supply a plurality of LWRs. When used in a nuclear fuel cycle, the LWRs can be used during the service period.

Thus, in one aspect, also provided are reactor series comprising a disclosed reactor and one or more thermal-spectrum reactors. In one aspect, the disclosed reactor and one or more thermal-spectrum reactors function in network. For example, fissile nuclear fuel originating from a disclosed source reactor can be supplied to one or more thermal-spectrum reactors. This fissile fuel can then be processed by the one or more thermal-spectrum reactors using known methods, such as fissioning the nuclear fuel. In one aspect, usable energy can be extracted from the fissile nuclear fuel supplied by the source reactor. In a further aspect, a disclosed source reactor can singularly supply a plurality of thermal-spectrum reactors, providing a high support ratio between the source reactor and the plurality of thermal-spectrum reactors.

The term "fertile material," as used herein, is used to describe nuclides which generally themselves do not undergo induced fission (fissionable by thermal neutrons) but from which fissile material can be generated through neutron absorption and subsequent nuclei conversions. Fertile materials that occur naturally which can be converted into a fissile material by irradiation with neutrons originating from the high power density neutron source include, but are not limited to, thorium-232 ($Th^{232}$) which converts into uranium-233

($U^{233}$), uranium-234 ($U^{234}$) which converts into uranium-235 ($U^{235}$), and uranium-238 ($U^{238}$) which converts into plutonium-239 ($Pu^{239}$). Artificial isotopes formed in the reactor which can be converted into fissile material by one neutron capture include, but are not limited to, plutonium-238 ($Pu^{238}$) which converts into plutonium-239 ($Pu^{239}$), and plutonium-240 ($Pu^{240}$) which converts into plutonium-241 ($Pu^{241}$).

Other actinides can need more than one neutron capture before converting into an isotope which is both fissile and long-lived enough to be able to capture another neutron and fission instead of decaying. For example, plutonium-242 ($P^{242}$) can be converted to americium-243 ($Am^{243}$), then to curium-244 ($Cm^{244}$), then to curium-245 ($Cm^{245}$). In another example, uranium-236 ($U^{236}$) can be converted to neptunium-237 ($Np^{237}$), then to plutonium-238 ($Pu^{238}$), then to plutonium-239 ($Pu^{239}$).

Thus, in one aspect, the second chamber can comprise a fertile material, such as the fertile materials discussed above. If a breeding reaction has occurred, the second chamber can further comprise a fissile material (i.e., the product of the bred fertile material upon neutron capture). The fissile material can be a material discussed above, or an otherwise fissile material. In a specific aspect, a disclosed embodiment can be used in a Thorium fuel cycle, wherein the second chamber comprises $Th^{232}$. If $Th^{232}$ has been converted to nuclear fuel or fissile material, then the second chamber can further comprise $U^{238}$. In one aspect, the second chamber can comprise a mixture of $Th^{232}$ and $U^{238}$, such that bred $U^{233}$ is denatured in situ (i.e., sufficiently diluted by $U^{238}$).

In one aspect, the fissile material in the second chamber is not enriched enough to be classified as weapons-grade or weapons-usable nuclear material. However, it will be apparent that through the use of the thorium cycle, for example, the risk of weapons conversion or diversion can be minimized, if not eliminated. No country, to date, has produced a weapons-usable or weapons-grade material from $U^{233}$. However, if desired, $U^{233}$ can be sufficiently diluted with $U^{238}$, a mixture which cannot be easily processed back to concentrated $U^{233}$, such that weapons diversion would not pose a risk. In a further aspect, if a nuclear breeding method yields Pu, the Pu can be burned in situ and would never have to leave the nuclear breeding plant.

Figure 3:
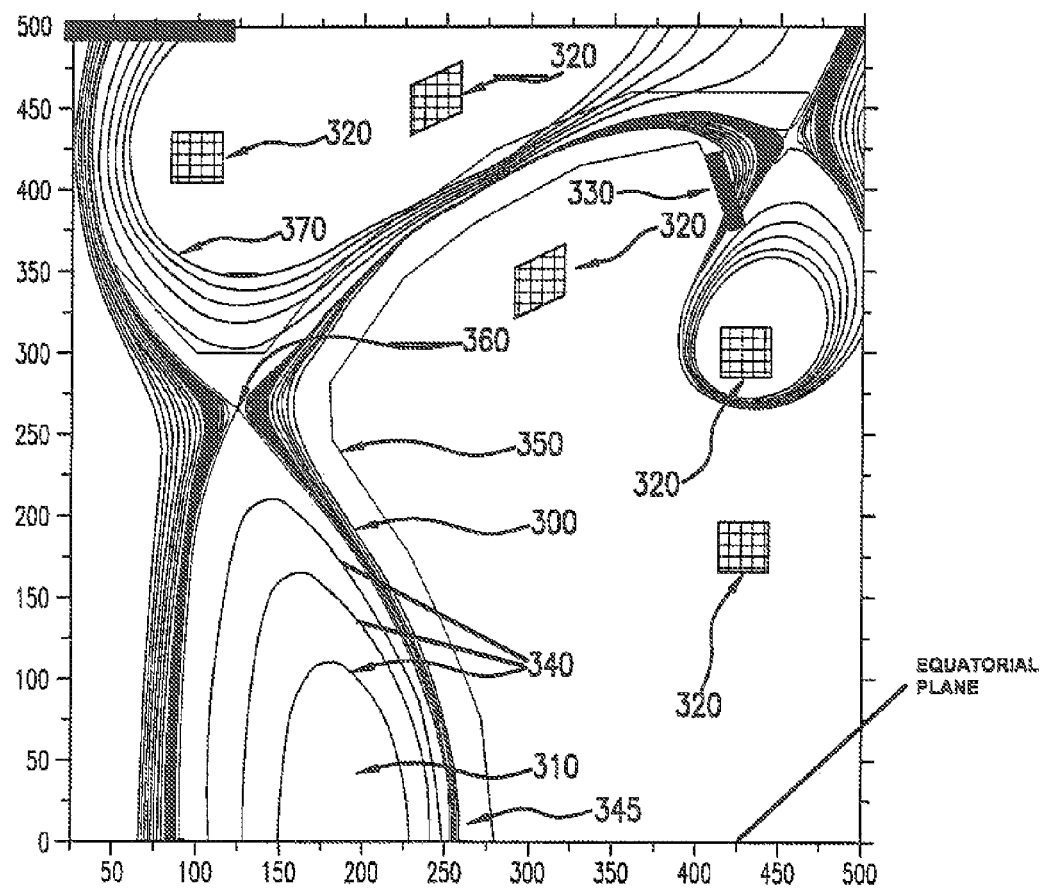
FIG. 3 shows a cross-sectional view of a disclosed embodiment generated by CORSICA TM.

The source of high power density neutrons can have a magnetic geometry and coil and divertor configuration, for example, as shown in FIG. 3, which is a cross-sectional view of a section of a toroidal reactor generated by a CORSICA TM computer program. CORSICA TM is software developed by The Lawrence Livermore National Laboratory, Livermore, Calif., for simulating physics processes in a magnetic fusion reactor. In this embodiment, plasma 310 can be primarily confined by closed magnetic surfaces 340, wherein a scrape off layer (SOL) 300 exists beyond said closed magnetic surfaces. The closed magnetic surfaces 340 (i.e., the toroidal field) about the plasma 310 are caused by a current induced in the plasma 310 by a toroidal field (TF) coil or conductor (not shown) that goes substantially through the center of the toroid, thereby inducing the current in the plasma 310 by a transformer action, as known in the art. The SOL 300 can comprise open magnetic field lines (relative to the closed magnetic surfaces 340 of the fusion plasma). A vacuum chamber 345 can be substantially enclosed by walls 350. Additional magnetic field lines 370 can exist outside said vacuum chamber. Coils 320 or current carrying conductors in or adjacent to the walls 350 can be used to produce magnetic fields (i.e., poloidal fields (PF)) that cause the open magnetic field lines. Said coils 320 or current-carrying conductors can shape and/or control magnetic field lines if there is a need to shape and/or control said lines, and create the open magnetic field lines for diverting cross-field flux (or scrape-off flux), i.e., particles that migrate from the fusion plasma 310 across the closed field lines 340 to the open magnetic field lines. Scrape-off flux can be diverted by the open magnetic field lines to a divertor plate 330, which as shown in FIG. 3 and can optionally be shielded from neutrons emitted from the fusion plasma 310. Because the divertor plate 330 is at a radial distance (straight line distance) from the fusion plasma 310 and at a magnetic distance (distance along a magnetic field line from the fusion plasma to the divertor plate) that is greater than other fusion reactors found in the art, the open magnetic field lines can be spread further at the divertor plate, thereby mitigating heat concentration on the divertor plate 330, and allowing radiant cooling of the particle from the time it leaves the fusion until it arrives at the divertor plate 330. In this embodiment, a second chamber comprising fertile material (not shown) can be substantially adjacent to at least a portion of said plasma 310 and/or said vacuum chamber 345 for confining said plasma. Various modifications of this embodiment can be made, as will be apparent from the present disclosure.

The reactor for breeding nuclear fuel can comprise any vessel compatible with fusion, and is not necessarily limited to known vessel designs. A vessel for containing plasma can be a fusion neutron source, if a reactive plasma is present. A vessel for containing plasma can also be a tokamak. It is understood that any disclosed component or embodiment can be used with any disclosed vessel for containing plasma, fusion plasma, fusion neutron source, or tokamak, or method of exhausting heat therefrom, unless the context clearly dictates otherwise.

In one aspect, the first chamber can be a toroidal chamber substantially enclosed by walls about a central axis, wherein said toroidal chamber has an inner radius and an outer radius relative to the central axis; a divertor plate for receiving exhaust heat from a fusion plasma substantially contained within the toroidal chamber by magnetic fields, said divertor plate having a divertor radius relative to the central axis and said divertor radius at least greater than or equal to the inner radius of the toroidal chamber. A second chamber comprising fertile material can be substantially adjacent to the fusion plasma.

Figure 4:
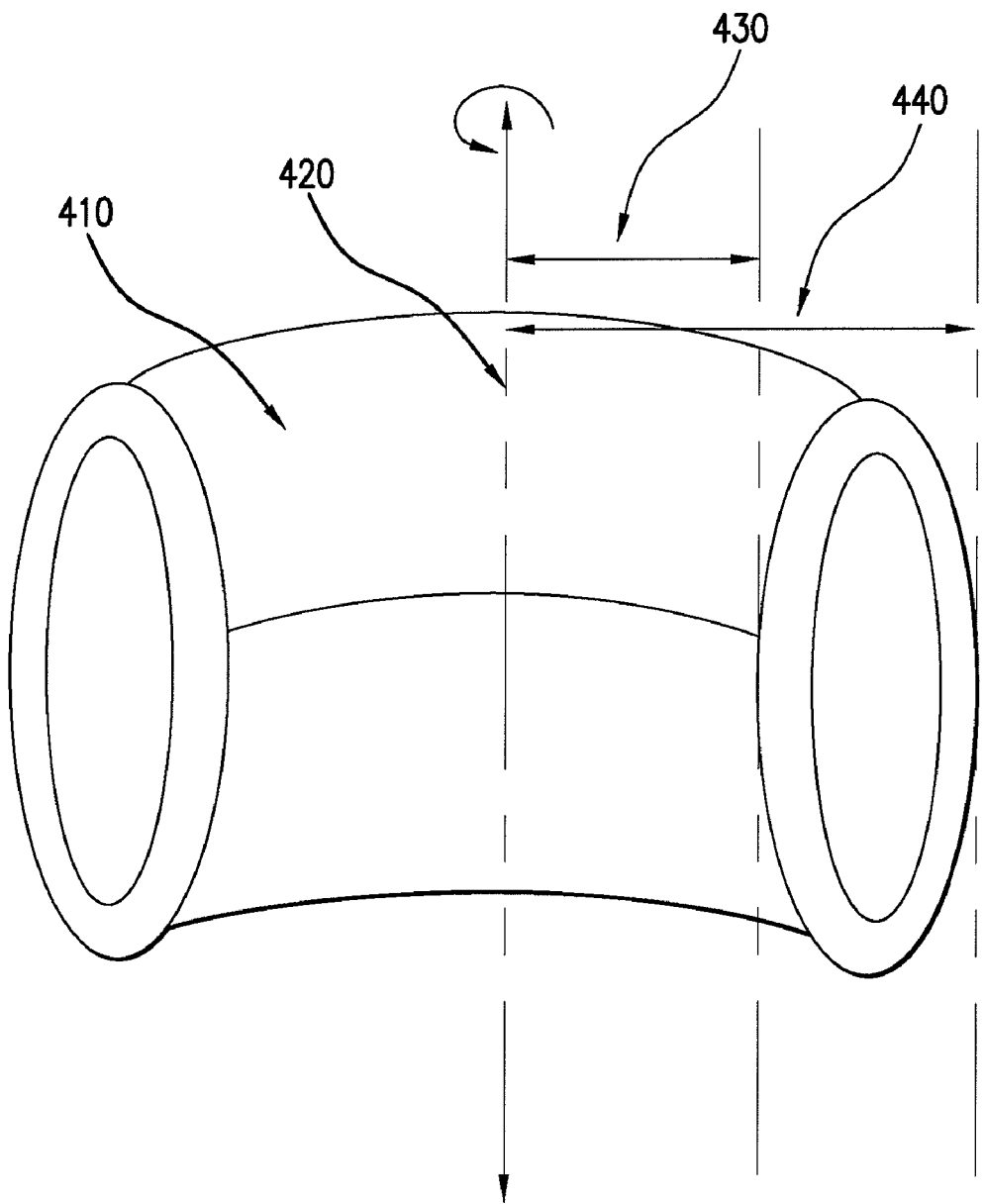
FIG. 4 shows a vessel around a central axis.

As used herein, "central axis" refers to an axis lying within a plane and passing through the centroid of a disclosed embodiment. A portion of a vessel, for example, surrounding a central axis is shown in FIG. 4. A portion of a vessel 410 surrounds a central axis 420. A point in space extending outward and substantially perpendicular to said central axis has a radius relative to said central axis. For example, said vessel can have an inner radius 430 closest to said central axis 420 and an outer radius 440 farthest from said central axis 420. In one aspect, said inner and said outer radius can be defined as a point extending from an imaginary line substantially perpendicular to said central axis 420 and positioned along the same x-y-z plane as the diameter of said vessel.

A disclosed first chamber can be any shape compatible for confining fusion plasma. In some aspects, at least a portion of the disclosed chamber can be toroidal. By "toroidal," it is meant that a rotation around a point on a central axis would be a toroidal rotation. Thus, in one aspect, a disclosed chamber is not necessarily toroidal as a whole, but rather a point within or on said chamber can produce, when rotated around a central axis, a toroidal shape.

In one aspect, a disclosed vessel can comprise any material known to be compatible with fusion reactors. Non-limiting examples include metals (e.g., tungsten and steel), metal alloys, composites, including carbon composites, combinations thereof, and the like.

In a further aspect, a disclosed embodiment comprises an improved divertor. As used herein, the "divertor" is meant to refer to all aspects within an embodiment that divert heat, energy, and/or particles from the core plasma to a desired location away from the core plasma. Examples of aspects of a divertor include, but are not limited to, the scrape-off layer, open magnetic field lines containing scrape-off flux therein, one or more divertor plates (or divertor targets), and one or more separatrices.

In a still further aspect, said divertor plate can comprise any material suited for use with a fusion reactor. Known existing divertor compositions can be used, such as, for example, tungsten or tungsten composite on a Cu or carbon composite. Other materials that can used include steel alloys on a high thermal conductivity substrate.

In one aspect, a divertor plate can have a divertor radius relative to the central axis and said divertor radius can be located at a position relative to another component or point within a disclosed embodiment. As one skilled in the art will appreciate, the ratio of the divertor radius relative to other components, e.g., the plasma or the chamber wall, etc., is intended to encompass any appropriate individual radius, and thus any actual divertor radius disclosed is meant to be purely exemplary, and as such, non-limiting.

As used herein, and represented by $R_{div}$, the term "divertor radius" is meant to refer to the farthest radial distance of the divertor plate from the central axis.

In one aspect, a divertor plate can have a divertor radius greater than or equal to about the outer radius of the toroidal chamber. In a further aspect, a divertor plate can have a divertor radius less than or equal to about the outer radius of the toroidal chamber. In a still further aspect, a divertor plate can have a divertor radius greater than or equal to about the inner radius of the toroidal chamber.

In one aspect, the ratio of the divertor radius, $R_{div}$, to the outer radius of the toroidal chamber, $R_c$, can be from about 0.2 to about 10, or from about 0.5 to about 8, or from about 1 to about 6, or from about 1 to about 5, or from about 1 to about 3, or from about 1 to about 2, of from about 1 to about 1.5.

In general, it is contemplated that any sized embodiment can be used. But, for example, said divertor plate can have a radius of about 0.2 m, 0.5 m, 1 m, 1.5 m, 2 m, 3 m, 4 m, 5 m, 6 m, 7 m, 8 m, 9 m, or about 10 m. In a further aspect, a divertor radius can be about 1.9 m, 3.3 m, 4 m, 7.3 m, or 7.5 m.

In one aspect, a divertor plate can have a divertor radius relative to an X point on a separatrix. As used herein, the term "separatrix" refers to the boundary between open and closed magnetic surfaces, and an X point refers to a point on the separatrix where the poloidal magnetic field is zero. In one aspect, multiple X points exist in a disclosed embodiment, and main plasma X point refers to an X point adjacent to the said core plasma. For example, referring back to FIG. 3, the main X point is shown as 360. The radius of a main X point generally depends on the configuration of the magnetic field lines. In one aspect, a divertor plate can have a major radius that is greater than or equal to the radius of the main X point.

In one aspect, the ratio of the divertor plate radius to the X point radius, $R_{div}/R_X$ can be from about 1 to about 5, or from about 1 to about 4, or from about 1 to about 3.5, or from about 1.5 to about 3.5. For example, a disclosed divertor plate and a disclosed separatrix can have radii as listed in Table 1, along with the corresponding ratio.

TABLE 1

Examples of $R_{div}$ and $R_X$.

| $R_{div}$ (m) | $R_X$ (m) | $R_{div}/R_X$ |
|---|---|---|
| 3.25 | 1.75 | 1.9 |
| 7.25 | 4.50 | 1.6 |
| 7.50 | 4.25 | 1.8 |
| 4.00 | 1.50 | 2.7 |
| 3.25 | 1.75 | 1.9 |
| 1.90 | 0.60 | 3.2 |
| 1.95 | 0.70 | 2.8 |
| 4.00 | 2.20 | 1.8 |

In yet a further aspect, a divertor plate can have a divertor radius relative to the major plasma radius, defined as the distance from said central axis to said plasma center. For example, the ratio of the divertor radius to the major plasma radius (R), $R_{div}/R$, can be from about 0.5 to about 10, or from about 1 to about 8, or from about 1 to about 6, or from about 1 to about 5, or from about 2 to about 5, including, for example, 0.5, 1, 2, 3, 4, 5, 6, 7, 8, 9, or 10. As a specific non-limiting example, if a plasma major radius is 1 m, and a divertor radius is 2 m, then $R_{div}/R=2$.

In one aspect, said divertor plate can be at least partially shielded from neutrons emitted from the core plasma. In a further aspect, said chamber walls at least partially shield the divertor plate from neutrons emitted from said core plasma, as shown, for example, in FIG. 3.

The neutron flux, defined as a measure of the intensity of neutron radiation in neutrons/cm²-sec. Neutron flux is the number of neutrons passing through 1 square centimeter of a given target in 1 second. Using embodiments of a divertor plate described herein, calculations show a decrease in neutron flux by a factor of over 10 as compared to other divertor plate designs.

Figure 8:
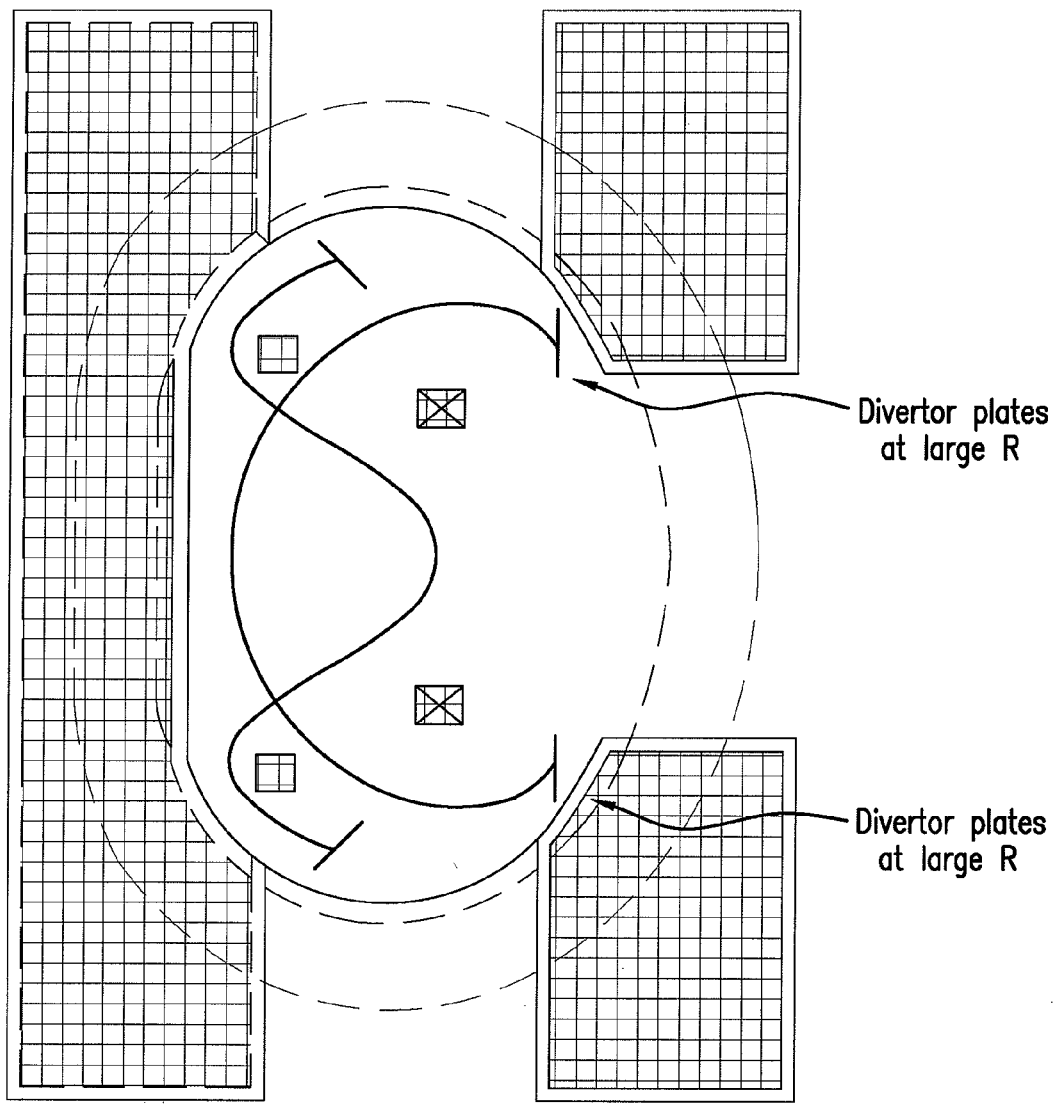
FIG. 8 shows a modified schematic of a tokamak comprising an embodiment of a disclosed divertor.

Additional divertor plates, not corresponding to the radii disclosed herein, can also be used in combination with a disclosed divertor plate. Specifically, known reactor designs can comprise divertor plates, wherein the divertor radius is less than the outer radius of a chamber, a plasma major radius, a separatrix, or another component or point within a vessel for containing fusion plasma. These known designs, in some aspects, can simply be augmented with an additional disclosed divertor design. Examples of such divertors include the standard divertor, as discussed herein, and the X divertor, as discussed in Kotschenreuther et al. "On heat loading, novel divertors, and fusion reactors," Phys. Plasmas 14, 72502/1-25 (2006), which is hereby incorporated into this specification by reference in its entirety (hereinafter Kotschenreuther). An exemplary embodiment of an X divertor is shown in FIG. 8, wherein four poloidal field coils placed substantially adjacent to divertor plates expand the magnetic flux near the divertor plates so that the heat and plasma particle fluxes flowing from the core plasma into the SOL fall on larger areas of the divertor plates.

Referring to FIG. 3 and FIG. 4, in one aspect, a disclosed embodiment comprises a toroidal chamber 410 about a central axis 420. A major radius of any point denotes its perpendicular distance from the central axis 420. Directions perpendicular to the central axis 420 are radial, and directions in any plane containing the central axis 420 are poloidal. A toroidal core plasma 310 is substantially confined within the toroidal chamber 345 by closed magnetic surfaces 340, which extend to the separatrix boundary as previously described. A region of open magnetic field lines 300 intersects one or more divertor plates 330 (this region can be referred to as the SOL (i.e., Scrape-Off Layer)). The separatrix separates the core plasma 310 from the SOL, and the SOL intersects the divertor plates 330. Particles and energy that flow from the core plasma 310 across the separatrix and into the SOL are directed along the open magnetic field lines 300 to the divertor plates 330. The closed magnetic surfaces 340 in the core plasma 310 and the open magnetic field lines 300 in the SOL are created by a current in the toroidal core plasma 310 and by currents in conductors 320 substantially adjacent to the toroidal chamber 345. The core plasma 310 and the SOL are substantially enclosed by walls 350. An equatorial plane, which is perpendicular to the central axis 420, and which passes through a point at the largest major radius in the core plasma 310, divides the toroidal chamber 345 into upper and lower regions. When only the upper region is shown, as in FIGS. 3 and 4, the lower region is substantially a mirror image of the upper region in the equatorial plane. A major radius of any point is that point's perpendicular distance from the central axis. The major radii of points in the core plasma 310 that are farthest (or closest) from the central axis 420 are the outer plasma major radius (or inner plasma major radius). Half of the sum of the outer and inner plasma major radii is the plasma major radius, and half of the difference between the outer and inner plasma major radii is the plasma minor radius. A point in the upper (or the lower) region of the core plasma 310 farthest from the equatorial plane is the upper (or the lower) peak point (i.e. X point 360). The largest major radius of points of intersection between the separatrix and the divertor plates 330 are the outboard divertor major radius and the corresponding divertor plate is the outboard divertor plate 330. A length along an open magnetic field line from a point approximately one-half centimeter outside the separatrix in the equatorial plane to the outboard divertor plate 330 is the SOL length, also known as the magnetic connection length.

A second chamber comprising fertile material can be substantially adjacent to the core plasma 310, when present, and/or the toroidal chamber 410. An equatorial plane, which can be perpendicular to the central axis 420, and which passes through a point on the largest major radius line in the core plasma 310, divides the toroidal chamber 345 into upper and lower regions. The major radii of points in the core plasma 310 that are farthest (or closest) from the central axis 420 are the outer plasma major radius (or inner plasma major radius). Half of the sum of the outer and inner plasma major radii is the plasma major radius, and half of the difference between the outer and inner plasma major radii is the plasma minor radius. A point in the upper (or the lower) region of the core plasma 310 farthest from the equatorial plane is the upper (or the lower) peak point. The largest major radius of points of intersection between the separatrix and the divertor plates 330 are the outboard divertor major radius and the corresponding divertor plate is the outboard divertor plate 330. A length along an open magnetic field line from a point approximately one-half centimeter outside the separatrix in the equatorial plane to the outboard divertor plate 330 is the SOL length.

A stagnation point is defined as any point where a poloidal component of the magnetic field is zero. In one aspect, the separatrix contains at least one stagnation point whose perpendicular distance from the equatorial plane is greater than the plasma minor radius, and, for at least one divertor plate 330, the outboard divertor major radius is greater than or equal to the sum of the plasma minor radius and the major radius of the peak point closest to the corresponding divertor plate 330 In one aspect, this divertor plate 330 can be referred to as a Super-X Divertor or a Super X Divertor (SXD).

In one aspect, current-carrying conductors or coils substantially adjacent to the toroidal chamber expand a distance between said open magnetic field lines at the divertor plate relative to a distance between the open magnetic field lines at an outer radius of the toroidal chamber such that heat transferred to said divertor plate by said particles striking the divertor plate is distributed over an expanded area of the divertor plate. The current carrying conductors 320 substantially adjacent to the toroidal chamber 345 can create a magnetic flux expansion in the SOL, i.e., decrease the poloidal component of the magnetic field in the SOL. Therefore, energy and particles transferred to the divertor plate 330 can be distributed over an expanded area of the divertor plate 330, thus decreasing the average and peak fluxes of energy and particles incident on the divertor plate 330, and the SOL length can be optionally increased. In one aspect, the SOL length is greater than twice the SOL length for an instance in which the divertor plate is located at the corresponding stagnation point and in a plane perpendicular to the central axis. In a further aspect, the SOL length to the divertor plate is long enough so that electrons coming from the core plasma cool to a temperature of less than about 40 electron volts (eV) of energy before reaching said divertor plate.

In yet a further aspect, the low plasma temperature near the divertor plate 330 allows an increase in radiation of energy from the plasma near the divertor plate 330. In a still further aspect, the SOL lengths to the divertor plate 330 are long enough to maintain a detached plasma, i.e., maintain a stable zone of plasma at a temperature less than about 5 eV between the divertor plate 330 and the plasma.

In one aspect, the pumping ability (i.e., the pumping of helium ash from fusion reactions) can be enhanced by embodiments of the divertor plate as described herein because the major radius of the divertor plate is larger than the major radius of the nearest peak point by an amount grater than the plasma major radius. While not wishing to be bound by theory, this enhancement can result in a) an increase in the neutral pressure near the divertor plate, b) decreased pumping channel lengths from the divertor to pumps, and/or c) increased maximum area of the pumping ducts due to the larger major radius of a disclosed divertor.

Because of the larger major radius of embodiments of the divertor plates as described herein, a liquid metal such as, for example, lithium, can be present or flowing on a disclosed divertor, and can, in some aspect, be used efficiently on the divertor plates because the lower magnetic field at the larger major radius reduces the magnetohydrodynamic effects on the liquid metal.

In one aspect, the purity of the core plasma can be increased by embodiments of the divertor plate described herein. Without wishing to be bound by theory, this can result from a) a reduction in sputtering from the divertor plate due to lower plasma temperature, b) an increase in plasma density near the plate that can reduce the amount of sputtered material reaching the core plasma, and/or c) the increased length of a disclosed divertor as compared to standard divertors, which results in any sputtering occurring further from the core plasma and sputtering at the divertor plate can be shielded from the core plasma by the walls of the toroidal chamber or the longer SOL distance between the divertor plate and the core plasma.

It should be appreciated that in a further aspect, the longer line length of the SOL in the divertor can enable one or more of the following improvements as compared to devices with standard divertors: a) allowing lower plasma temperature near the divertor plates, b) allowing higher plasma and neutral densities near the divertor plates, c) enhanced spreading of heat by either plasma-generated or externally driven turbulence in the SOL, without also significantly increasing the turbulence in the core plasma, and/or d) sweeping the regions of highest heat or particle flux on the SXD plates at a rate fast enough so that the resulting spatial and temporal redistribution of the heat flux reduces the peak temperature of the divertor plate.

In one aspect, the use of embodiments of the divertor plate described herein allows power density in the core plasma to be substantially higher than known toroidal plasma devices. In a further aspect, the fusion power density in the core plasma is substantially higher than known toroidal plasma devices. For example, if power density is defined as the quotient of the core heating power in megawatts and the plasma major radius (described in more detail herein) in meters, then embodiments described herein can produce a power density of about five megawatts per meter or greater. Of course, lower power densities are also contemplated within the scope of the described embodiments. This high power density can result in a core plasma of sufficient heat and density to produce a large number of neutrons from fusion reactions of plasma particles.

It will be apparent that the various disclosed radii for components within a disclosed embodiment can be determined by a physical measurement of a working embodiment. Or, in the alternative, a disclosed radius can be determined through a model, such as, for example, a model generated by CORSICA TM. Thus, in one aspect, a physical embodiment can be deduced to a model, and the various parameters can be determined by the model.

In one aspect, a disclosed embodiment comprises plasma or fusion plasma that is substantially magnetically contained within a vessel for containing the plasma, a fusion neutron source, or a tokamak, by closed magnetic surfaces and open magnetic field lines relative to the fusion plasma. A disclosed core plasma can have a major radius and a minor radius. The major radius of the plasma can be the radius of the plasma as a whole (from the central axis to the center of the plasma). The minor radius can be the radius of the plasma itself, i.e., a distance extending from the center of the plasma to the perimeter of said plasma.

The fuel to be used as plasma can, at least in principle, comprise combinations of most of the nuclear isotopes near the lower end of the periodic table. Examples of such include, without limitation, boron, lithium, helium, and hydrogen, and isotopes thereof (e.g., $^2$H, or deuterium). Non-limiting reactions of deuterium and helium, for example, which can occur within nuclear fusion plasma are listed below.

D+D→p+T (tritium)+~3 MeV, wherein p is a proton.

D+D→n+$^3$He+~4 MeV, wherein n is a neutron.

D+T→n+$^4$He+~17 MeV.

D+$^3$He→p+$^4$He+~18 MeV.

Any known means of heating a fuel to create said fusion plasma, and heating said fusion plasma to the temperatures required for fusion to occur can be used in combination with the disclosed embodiments, including the disclosed methods. Plasmas can be generated in various ways including DC discharge, radio frequency (RF) discharge, microwave discharge, laser discharge, or combinations thereof, among others. Plasmas can be generated and heated, for example, by ohmic heating, wherein plasma is heated by passing an electrical current thought it. Another example is magnetic compression, whereby the plasma is either heated adiabatically by compressing it though an increase in the strength of the confining field, or it is shock heated by a rapidly rising magnetic field, or a combination thereof. Yet another example is neutral beam heating, wherein intense beams of energetic neutral atoms can be focused and directed at the plasma from neutral beam sources located outside the confinement region.

Combinations of the aforementioned heating protocols can be used, as well other methods of heating. For example, neutral beam heating can be used to augment ohmic heating in a magnetic confinement device, such as a tokamak. Other methods of heating include, without limitation, heating by RF, microwave, and laser.

Any appropriately shaped plasma of any size compatible with a disclosed embodiment can be used. A discussion of plasma shapes can be found in "ITER," special issue of Nucl. Fusion 47 (2007), which is hereby incorporated by reference into this specification in its entirety. The shape of fusion plasma, in one aspect, can determine the desire of a particular shape of a vessel for containing said fusion plasma.

Various factors can determine a desired plasma size, one of which is the containment time, which is $\Delta t = r^2/D$, wherein r is a minimum plasma dimension and D is a diffusion coefficient. The classical value of the diffusion coefficient is $D_c = a_i^2/\tau_{ie}$, wherein $a_i$ is the ion gyroradius and $\tau_{ie}$ is the ion-electron collision time. Diffusion according to the classical diffusion coefficient is called classical transport.

The Bohm diffusion coefficient, attributed to short-wavelength instabilities, is $D_B = (1/16) a_i^2 \Omega_i$, wherein $\Omega_i$ is the ion gyrofrequency. Diffusion according to this relationship is called anomalous transport. The Bohm diffusion coefficient for plasma, in some aspects, can determine how large plasma can be in a fusion reactors, vis-à-vis a desire that the containment time for a given amount of plasma be longer than the time for the plasma to have nuclear fusion reactions. On the contrary, reactor designs have been proffered wherein a classical transport phenomenon is, at least in theory, possible. Thus, in one aspect, one or more disclosed embodiments can be compatible with plasma comprising anomalous transport and/or classical transport.

During magnetic confinement of plasma, ionized particles can be constrained to remain within a defined region by specifically shaped magnetic fields. Such a confinement can be thought of as a nonmaterial furnace liner that can insulate hot plasma from the chamber walls.

In one embodiment, a magnetic field can be created to form a torus or a doughnut-shaped figure within which magnetic field lines form nested closed surfaces. Thus, in this geometry, plasma particles are permitted to stray only by crossing magnetic surfaces. In theory, this diffusion is a very slow process, the time for which has been predicted to vary as the square of the plasma minor radius, although much faster cross-diffusion patterns have been observed in experiment.

To direct anomalous and/or classical cross-magnetic field particle transport away from the plasma, particles from the fusion plasma that cross said separatrix can be directed to a plasma-wetted area on said divertor plate by said open magnetic field lines in said scrape off layer outside said separatrix.

In a further aspect, a disclosed embodiment can provide at least one divertor plate wherein the plasma-wetted area, $A_w$, on at least one divertor plate is increased beyond currently known fusion neutron source designs. Without wishing to be bound by theory, in an embodiment comprising one or more divertor plates, $A_w$ on the divertor plate can be bound via the equation Divergence of B=0, to be $$A_w = \frac{B_{p,sol}}{B_{div}} \frac{A_{sol}}{\sin(\theta)} \approx \left[\frac{B_p}{B_t}\right]_{sol} \frac{R_{div}}{R_{sol}} \frac{A_{sol}}{\sin(\theta)},$$

wherein $R_{sol}$, $W_{sol}$, and $A_{sol}=2\pi R_{sol}W_{sol}$ are the radius, width, and area of the scrape-off layer (SOL) at the (outer or inner) midplane for the corresponding divertor plates, wherein $\theta$ is the angle between the divertor plate and the total magnetic field, $B_{div}$, and the subscripts p(t) denote the poloidal (toroidal) directions. For a given $W_{sol}$ and $B_p/B_t$ at the midplane, $A_w$ can be increased, in one aspect, by reducing $\theta$. However, it is apparent that engineering constraints can, in some aspects, place a limit of about 1 degree on the minimum $\theta$, as determined, for example, in the ITER design, outlined in "ITER," special issue of Nucl. Fusion 47 (2007), which is hereby incorporated by reference into this specification in its entirety. However, some disclosed designs comprise a divertor plate with a $\theta$ of less than about 1 degree (e.g., 0.9°).

Figure 17:
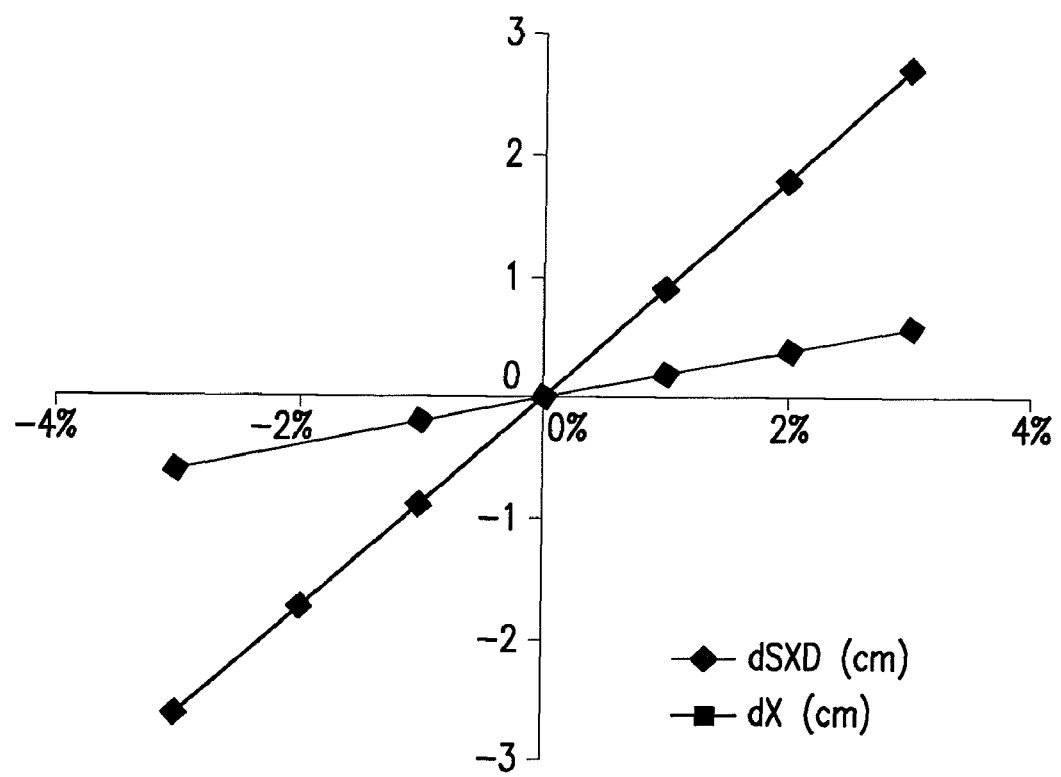
FIG. 17 is a plot showing the reduced effect of plasma motion on location of divertor strike-point for a disclosed divertor as compared to the greater effect of the same plasma motion on plasma X point.

In one aspect, a disclosed embodiment can comprise an increase in $R_{div}$, the divertor radius (with respect to the central axis) to affect an increase in $A_w$. It should be appreciated that increasing $R_{div}$, in one aspect, increases the distance between the divertor plate and the current in the plasma, which can make the divertor less sensitive than a standard divertor to plasma fluctuations. For example, as shown in FIG. 17, by changing the plasma pressure (or current) by ±5% (while holding coil currents and flux through the wall fixed to simulate sudden changes), this moves the outer strike points on the disclosed divertor plate by only about ±0.05 cm (see curve labeled dSXD in FIG. 17) which is much smaller than about ±2.5 cm motion produced in a standard divertor (see curve labeled dX in FIG. 17), Such small motions are small fractions of the widths of an exemplary plasma-wetted area (about 20 cm).

In one aspect, particles from said fusion plasma can travel a magnetic distance along open magnetic field lines from the fusion plasma to the divertor plate that is greater than a radial distance from the fusion plasma to the divertor plate. In a further aspect, the particles cool while traveling the magnetic distance along the open magnetic field lines to the divertor plate.

It is apparent that an increase in $R_{div}/R_{sol}$ can increase the magnetic connection length, L, of a scrape off flux particle by increasing the poloidal field all along the divertor leg at R. In one aspect, an extended L can increase the maximum allowed power ($P_{sol}$) in the scrape-off layer (SOL). The maximum divertor radiation fraction and the cross-field diffusion can both be enhanced. The longer L in a disclosed divertor can restore the capacity for substantial radiation even at high $q_\parallel$ (heat transferred per unit mass), increasing $P_{sol}$ relative to a standard divertor by a factor of about 2. The longer line lengths can lower the plasma temperature at the plate at relevant high upstream $q_\parallel$. These results can be obtained, for example, by 1D-code, using CORSICA TM, for example, as described in Kotschenreuther. As the plasma particles flow to the divertor along the extended field lines, cross-field diffusion effectively widens the SOL, resulting in a larger plasma footprint on the divertor plate. In one aspect, for example, an increase in SOL width by about 1.7 relative to a standard divertor can be expected.

A disclosed embodiment can provide for improvements in the capability of a fusion neutron source, vessel for containing fusion plasma, or tokamak to manage the problem of heat exhaust. The heat exhaust that occurs during the operation of a nuclear fusion reactor can be related to the heating power, $P_h$=auxiliary heating power, $P_{aux}$ plus about 20% of the fusion power, $P_f$. For example, two of largest current tokamaks, the joint European torus (JET) in the European Union, with a major radius R=3 m, and the JT-60 tokamak in Japan, with R=3.4 m, each have a $P_h$=120 MW, which is less than the $P_f$ of about 400-500 MW. ITER (France), a joint international research and development project that aims to demonstrate the scientific and technical feasibility of fusion power, by contrast, is designed for a $P_h$ ~400-720 MW, with $P_f$~2000-3600 MW. A measure of the severity of the heat flux problem can be estimated, in some aspects, as $P_h/R$, wherein R is the plasma major radius.

Kotschenreuther (previously incorporated by reference in its entirety), discusses the severity of the heat flux problem in detail. Specific reference is made to Table 1 of Kotschenreuther and the discussion of the data presented therein, as it applies to the present context, wherein various $P_h/R$ values for known reactors, including future reactors, are listed.

In one aspect, a disclosed embodiment can be a tokamak. As used herein, the term "tokamak" refers to a magnetic device for confining plasma. While tokamaks generally comprise a toroidal shaped magnetic field which is substantially axisymmetric, i.e., approximately invariant under toroidal rotations about a central axis, a "tokamak," as disclosed herein, is not limited to an axisymmetric toroidal shape. Other toroidal designs and shapes, both known and unknown, will likely be compatible with the various embodiments disclosed herein. Known toroidal alternatives to the traditional tokamak reactor are stellarators, spherical toroids (i.e., a cored apple shaped tokamak), reverse-field pinch reactors, and spheromaks.

In one aspect, a tokamak can further comprise a second chamber comprising a fertile material substantially adjacent to a chamber for confining core plasma. In addition, a sheath of neutron reflecting material (e.g., Pb) can substantially surround the tokamak, or at least the first chamber or the second chamber of the tokamak.

It should be appreciated that, in various embodiments, the geometrical configurations of the divertor plate as described herein can be accommodated by most, if not all, known tokamak designs, including predicted future tokamak designs. As an example, a divertor plate can fit inside toroidal field coils in corners or sections that often go unused, and any toroidal field ripple (unwanted curving of magnetic field lines) arising at the divertor plates can be handled by slight shaping of the magnetic field lines using, for example, an induced current.

In one aspect, a disclosed embodiment can be a Tokamak based High Power Density (HPD) Device. High power density of a disclosed device can be attained, for example, by reducing the size of the device, thereby increasing the power density. In one aspect, a disclosed high power density embodiment can have a major radius R of from about 1 m to about 5 m, or from about 1 m to about 4 m, or from about 1 m to about 3 m. Parameters for an exemplary high power density device are listed in Table 2. With reference to Table 1, an exemplary device can have a major radius of about 2.2 m, with an aspect ratio of about 2.5, wherein the aspect ratio is defined as the major/minor dimensions of the plasma torus at the horizontal equatorial plane (plasma major radius/plasma minor radius=aspect ratio).

Angular brackets such as < > denote average value of a parameter averaged over the core plasma volume. For example, <n> denotes the average density of particles in the core plasma.

Elongation of the plasma confined in a disclosed embodiment of a Tokamak based High Power Density (HPD) Device can be from about 1.5 to about 4, or from about 2 to about 3. Elongation measures the vertical height of the plasma minor cross section compared to the horizontal minor cross section. This parameter is typically measured at the separatrix (i.e., the magnetic surface dividing the closed plasma nested flux surfaces from the open ones that intersect the material walls) as well as at 95% of the flux at the separatrix (it can be zero at the plasma centre), which gives a good measure of the useful part of the plasma—the last 5% is affected somewhat by particles which are sometimes outside the separatrix and sometimes inside. With reference to Table 1, an exemplary high power density device can have an elongation of about 2.4 to about 2.7.

A disclosed embodiment of a Tokamak based High Power Density (HPD) Device can have a toroidal plasma current ($I_p$) of from about 10 to about 20 MA, or from about 10 to about 15 MA. It will be apparent that $I_p$ can change during the operation of an embodiment. With reference to Table 2, for example, $I_p$ for an exemplary embodiment can be from about 12 to about 14 MA. A disclosed HPD device can have a self-generated confinement magnetic field (bootstrap current fraction) of about 30 to about 90%, or from about 30 to about 80%. An exemplary device, for example, can have a bootstrap fraction of from about 40 to about 70% (Table 2). The current drive power in such a device, can be, for example, from about 20 to about 90 MW (e.g., from about 25 to about 60 MW, see Table 2). Although not wishing to be bound by theory, in one aspect, additional power for D-D fusion and/or Ion Cyclotron Resonance Heating (ICRH) can be from about 20 to about 50 MW. For example, power for these processes can be about 40 MW (Table 2).

If a Cu coil (e.g., a coil with about 60% Cu) is used for an HPD device, coil related dissipation can be about 160 MW for an exemplary device. The CD electric input to provide power to these coils can be, for example, from about 50 to about 120 MW. It is thought that the $B_T$ at an exemplary Cu coil would be about 7 T (Table 2).

The $I_p$ and other induced currents, if present, can create a magnetic flux density at the plasma center, $B_T$, of from about 2 T (Tesla) to about 10 T, or from about 2 T to about 5 T. For example, a disclosed HPD device can have a magnetic flux density at the plasma center of about 4.2 T (Table 2). The volume averaged temperature <T> can be from about 10 to about 20 keV, or from about 10 to about 18 keV. For example, an HPD device can have a volume averaged temperature <T> of about 15 keV (Table 2).

The normalized β ($β_N$) in a disclosed HPD device can be from about 2 to about 8, or from about 2 to about 5. An exemplary device, as listed in Table, can have a $β_N$ of about 3-4.5. Normalized β ($β_N$), as used herein, is plasma beta times a·B/I (a=minor radius, B=toroidal magnetic field on central axis, and I=plasma current). Plasma beta is the ratio of plasma pressure (the sum of the product of density and temperature over all the plasma particles) divided by the magnetic pressure ($B^2/2μ_0$)—a volume-integrated parameter which measures how good the magnetic field is at confining the plasma, and is typically a few % (percent).

Peaking value of a parameter is the ratio of its maximum value to its volume averaged value in the core plasma.

A disclosed HPD device can have a fusion power of up to 500 MW, or from about 0 MW to about 500 MW. An exemplary device, as listed in Table 2, can have a fusion power of up to about 400 MW, or from about 0 MW to about 400 MW. Fusion power, as used herein, is the total power generated by the fusion reactions in the plasma (i.e., not taking account of any energy multiplication that can take place by reactions in the surrounding structure). Other power parameters include Alpha-particle power, which is the part of the fusion power carried by the fused nuclei. Alpha power plus external heating power minus radiated power is the net heating power to the plasma. For a plasma generating a fusion power of up to 500 MW, an exemplary device can have a neutron wall load of from about 2 to about 3 MW/m² (Table 2). Impurities in the plasma, depending on the composition, can, in one aspect, comprise He (e.g., 10% He) and/or Ar (e.g., 0.25% Ar).

With reference to Table 2, a disclosed HPD device can have a $H_{89P}$, wherein $H_{89P}$ is the energy confinement improvement factor compared with the ITER89-P, of from about 2.6 to about 2 (for DIII-D reactions). It will be apparent that such a device can have a Q value, defined as the fusion power/input power of about 0.1 to about 1.9.

TABLE 2

Parameters for exemplary Tokamak High Power Density Device

| | |
|---|---|
| R major | 2.2 |
| Aspect ratio | 2.5 |
| Elongation | 2.4-2.7 |
| $I_p$ | 12-14 MA |
| $B_T$ (plasma center) | 4.2 T |
| <n> | 1.6 × 10²⁰ |
| <T> | 15 kev |
| $β_N$ | 3-4.5 (DIII-D) |
| Peaking p(0)/<p>, n(0)/<n> | 2-2.5, 0-1.6 |
| Fusion Power | Up to 400 MW |
| Bootstrap fraction | 40%-70% (DIII-D) |
| Current Drive power | 25-60 MW |
| Other power for DD (ICRH?) | 40 MW |
| $H_{89P}$ factor | 2.6-2 (DIII-D) |
| CD η (scaled from reactor studies as n/R) | .15 |
| Impurities | 10% He .25% Ar |
| Fusion Power | 300-400 MW |
| Coil related dissipation | 160 MW |
| CD electric input | 50-120 MW |
| $B_T$ at Copper TF coil | 7 T |
| Cu fraction in coil | 60% |
| Current Drive wall plug-plasma efficiency | 50% |
| Neutron Wall load | 2-3 MW/m² |
| $Q_{XT}$ | 1.-1.9 |

It is understood that the disclosed tokamaks can be used in combination with the disclosed components (e.g., divertor plates, etc.), methods, devices, and systems.

Figure 5E:
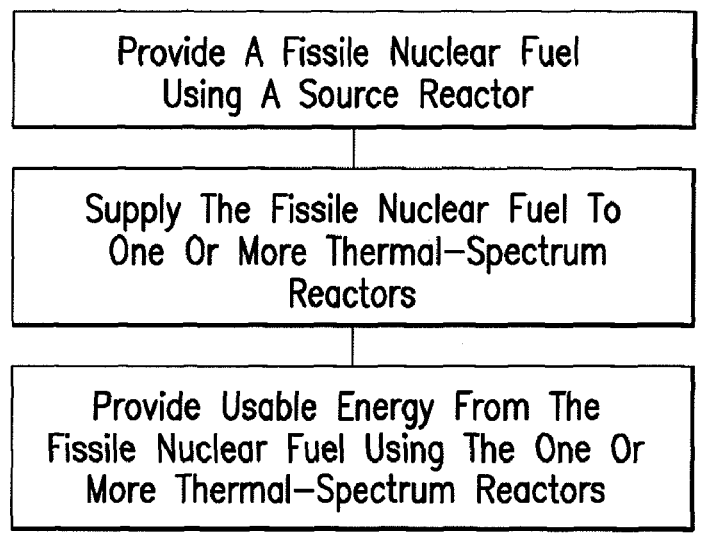
Figure 6:
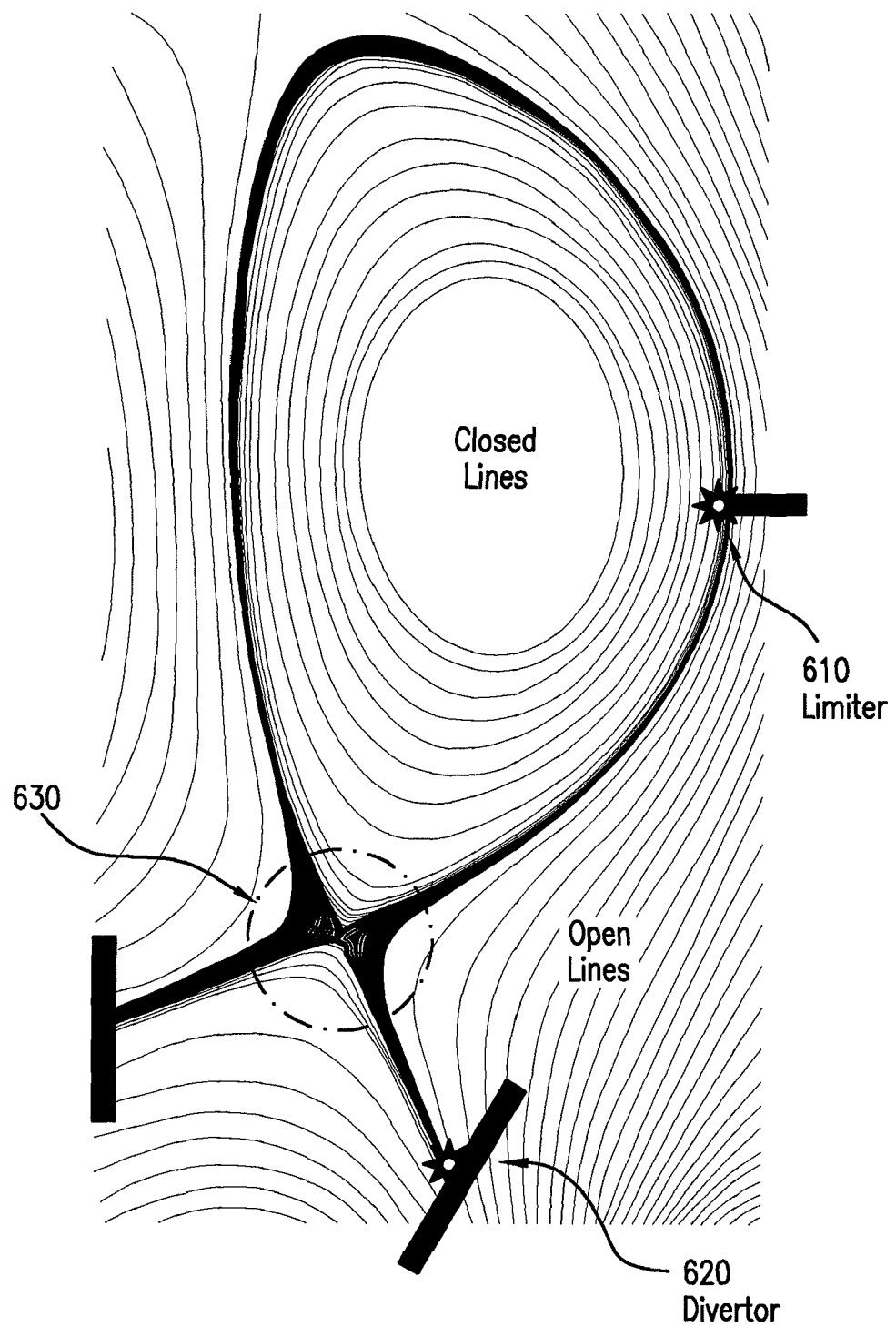
FIG. 6 shows a prior art magnetic confinement configuration comprising a limiter and a divertor.
Figure 7:
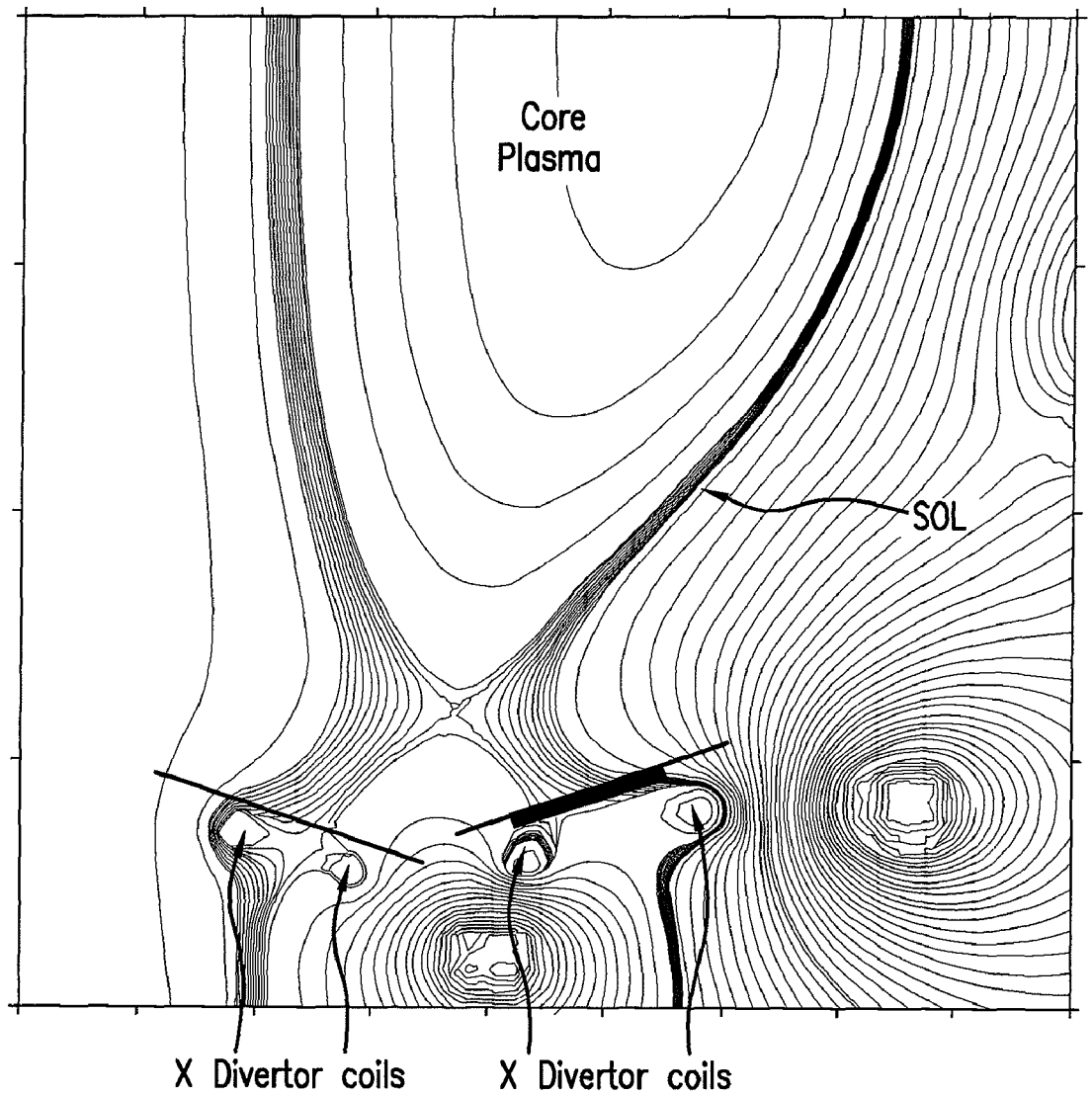
FIG. 7 shows a prior art magnetic confinement configuration comprising an X divertor, as described in Kotschenreuther et al. "On heat loading, novel divertors, and fusion reactors," Phys. Plasmas 14, 72502/1-25 (2006)

Also disclosed are methods of breeding nuclear fuel. In one aspect, as shown in the partial flowchart of FIG. 5A, a method of breeding nuclear fuel comprises the steps of: providing a reactor comprising a first chamber comprising a plasma for producing high power density neutrons, providing neutrons from the plasma in the first chamber to a fertile material in a second chamber, thereby converting at least a portion of the fertile material to fissile material. Optionally, a method of breeding nuclear fuel can further comprise fissioning the fissile material, thereby providing usable energy.

In a further aspect, as shown in the partial flowchart of FIG. 5B, a method of breeding nuclear fuel using a disclosed embodiment comprises the steps of: creating a fusion plasma in a first chamber about a central axis, said first chamber substantially enclosed by walls and having an inner radius and an outer radius relative to a central axis, wherein the fusion plasma is substantially contained within said toroidal chamber by closed and open magnetic field lines relative to the fusion plasma and created by a current induced in said fusion plasma and by current-carrying conductors substantially adjacent to said toroidal chamber; and directing particles from the fusion plasma that cross said closed magnetic surfaces to said open magnetic field lines to a divertor plate having a divertor radius relative to the central axis that is greater than or equal to the outer radius of the toroidal chamber, said particles directed to said divertor plate by said open magnetic field lines; and providing neutrons to a second chamber comprising a fertile material positioned substantially adjacent to at least a portion of said core plasma from said core plasma such that at least a portion of the fertile material is converted to fissile material.

Another aspect of breeding nuclear fuel using a disclosed embodiment is described in FIG. 5C. In this process, a toroidal core plasma is created in a toroidal chamber about a central axis. The toroidal core plasma is substantially confined within the toroidal chamber by magnetic field lines that stay substantially on closed toroidal magnetic surfaces. The magnetic field lines are created by currents in the core plasma and in current-carrying conductors substantially adjacent to the toroidal chamber. The toroidal core plasma is substantially enclosed by a region of open magnetic field lines that intersect one or more divertor plates. Particles are directed from the toroidal core plasma that cross the closed magnetic surfaces to the open magnetic field lines to the one or more divertor plates. At least one of the one or more divertor plates is placed at an outboard divertor major radius that is greater than or equal to a sum of a plasma minor radius and a major radius of the peak point closest to the corresponding divertor plate. Neutrons are provided to a layer of fertile material substantially adjacent to at least a portion of said core plasma from said core plasma such that at least a portion of said fertile material is converted into fissile material.

FIG. 5D illustrates an embodiment of a method of breeding nuclear fuel. The described embodiment comprises step 502, providing a first chamber enclosed by walls about a central axis. At step 504, a high power density neutron source is contained within the first chamber. In one aspect, the high power density source is a compact fusion neutron source containing a core plasma and comprised of at least one divertor plate that has an outboard divertor major radius that is greater than a sum of a fusion plasma minor radius and a major radius of a peak point closest to the corresponding divertor plate. In one aspect, the compact fusion neutron source has a ratio of total heating power to a core plasma major radius of about 5 megawatts/meter or higher. Further, in one aspect the high power density neutron source is a tokamak with a core plasma major radius of about three meters or smaller. The high power density neutron source has a total power of about 0.1 megawatts per meter squared per second, or higher, of neutrons crossing a surface of the high power density neutron source. At step 506, fertile material is placed in a second chamber that is substantially adjacent to at least a portion of the first chamber. Neutron-absorbing and neutron-reflecting materials can also placed in the second chamber so that at step 508 neutrons from the high power density neutron source convert at least a portion of the fertile material to fissile material.

The neutrons as provided from said high power density neutron source can convert at least a portion of the fertile material to fissile material. One or more neutrons from said high power density neutron source can be absorbed by the fertile material, creating a fissile isotope.

Also provided are methods of energy production using a disclosed embodiment. With reference to the partial flowchart shown in FIG. 5E, a method for energy production can comprise the steps of: providing a fissile nuclear fuel using source reactor; supplying the fissile nuclear fuel to one or more thermal-spectrum reactors; and providing usable energy from the fissile nuclear fuel using the one or more thermal-spectrum reactors. In one aspect, the source reactor comprises a first chamber enclosed by walls about a central axis, wherein said first chamber has an outer radius of four meters or less relative to the central axis, wherein said first chamber encloses a high power density neutron source which produces a total neutron power equal to about 0.1 megawatts per meter squared per second or higher, crossing the surface of the high power density neutron source; a second chamber enclosing a fertile material, the second chamber being substantially adjacent to at least a portion of the first chamber. In a further aspect, the source reactors is a disclosed reactor, such as those reactors mentioned above. In a still further aspect, the plasma in the first chamber comprises a ratio of total heating power to core plasma major radius of about 5 megawatts/meter or higher.

In one aspect, a method of breeding nuclear fuel can comprise any of the methods or embodiments mentioned above. In a further aspect, a method of energy production comprises another fuel cycle method, such as, for example, mining a planetary body (e.g., the earth) for fertile material.

In one aspect, the fertile material can be supplied to the source reactor following a mining step. The fertile material can then be converted, at least partially, to fissile material, which can then be transferred to a thermal-spectrum reactor (e.g., a Light Water Reactor (LWR)). It should be appreciated that, in one aspect, a source reactor can singularly supply a plurality of thermal-spectrum reactors. Thus, the embodiments disclosed herein can provide for a high support ratio among source and thermal-spectrum reactors. It will be apparent that such a high support ratio can provide for practical nuclear fuel cycles.

It is understood that the disclosed methods can be used in combination with any aspect of any disclosed embodiment, including vessels for containing fusion plasma, fusion neutron sources, and tokamaks. Thus, for example, a method of exhausting heat comprising a disclosed step can be applied to a vessel for containing fusion plasma, a fusion neutron source, or a tokamak.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Modified Design of Steady State Superconducting Tokamak

FIG. 8, modified from Bora et al., Brazilian Journal of Physics Vol. 32, no. 1, pg. 193-216, March 2002, the contents of which are incorporated herein by reference, displays an exemplary modified design of a Steady State Superconduction Tokamak (SST). Various parameters for the SST embodiment are listed in Table 3. An SST device can comprise a toroidal chamber, wherein at least a portion of the toroidal chamber comprises graphited-bolted tiles. Stabilizer materials can also be used with such a device and can comprise, for example, a Cu alloy (e.g., a Cu—Zr alloy). An exemplary SST design can have a plasma major radius, R, defined as the distance from the central axis to the center of the plasma, of about 1.1 m, and a plasma minor radius, a, defined as the distance from the center of the plasma to the perimeter of the plasma where the plasma is thickest, of about 0.2 m. The plasma current, $I_p$, as defined hereinabove, can be about 220 kA, with a Toroidal Field begin defined by a magnetic flux density at the plasma center, $B_T$, of about 3 Tesla. Such a device can comprise a fertile material substantially adjacent to the toroidal chamber.

The plasma for such an SST design can have an elongation of ≦about 1.9, and a triangularity of ≦about 0.8, wherein triangularity refers to a measure of the degree of distortion towards a D-shaped plasma minor cross section from an elliptic shaped plasma cross section. A fuel for a plasma confined within an SST device can, for example, comprise hydrogen gas. The plasma can be created and/or heated by ohmic heating, discussed hereinabove. Additional current that can be used during the course of an operation of an SST device include LHCD, or Lower Hybrid Current Drive, which can be current originating from quasi-static electric waves propagated in magnetically confined plasmas. The ohmic heating plus the LHCD can be, for example, 1 MW at 3.7 GHz. Ion Cyclotron Resonance Heating (ICRH) and Neutral Beam Injection Heating (NBI) can each be about 1 MW, wherein the sum of each is about 2 MW.

An exemplary SST device can have a divertor configuration as defined herein, wherein the divertor plate is positioned relative to a component or aspect of a device. A divertor configuration can be a double null (DN configuration). Such a divertor system can be compatible, for example, with an average heat load of about 0.5 MW/m$^2$, with a peak heat load of about 1 MW/m$^2$.

For a pulsed experiment, a discharge duration (i.e., the amount of time external current is applied to the device per pulse) can be, for example, about 1000 seconds.

TABLE 3

Parameters for modified SST design

| | |
|---|---|
| Major Radius, R | 1.1 m |
| Minor Radius, a | 0.2 m |
| Plasma Current $I_p$ | 220 kA |
| Toroidal Field, $B_T$ | 3 Tesla |
| Elongation | ≦1.9 |
| Triangularity | ≦0.8 |
| Discharge duration | 1000 seconds |
| Fuel Gas | Hydrogen |
| Divertor Configuration | DN |
| Divertor Heat Load | 0.5 MW/m$^2$ (average); 1 MW/m$^2$ (peak) |
| First Wall Material | Graphited-bolted tiles |
| Stabilizer Material | Cu—Zr alloy |
| Number of SC TF Coils | 16 |
| Number of SC PF Coils | 9 |
| Number of SC PF Coils | 6 |
| Current Drive | Ohmic + LHCD (1 MW @ 3.7 GHz) |
| Heating | ICRH (1 MW) NBI (1 MW) = 2 MW |

2. Divertor Designs Comprising Extended Single and Split Divertor Coils

Figure 9A:
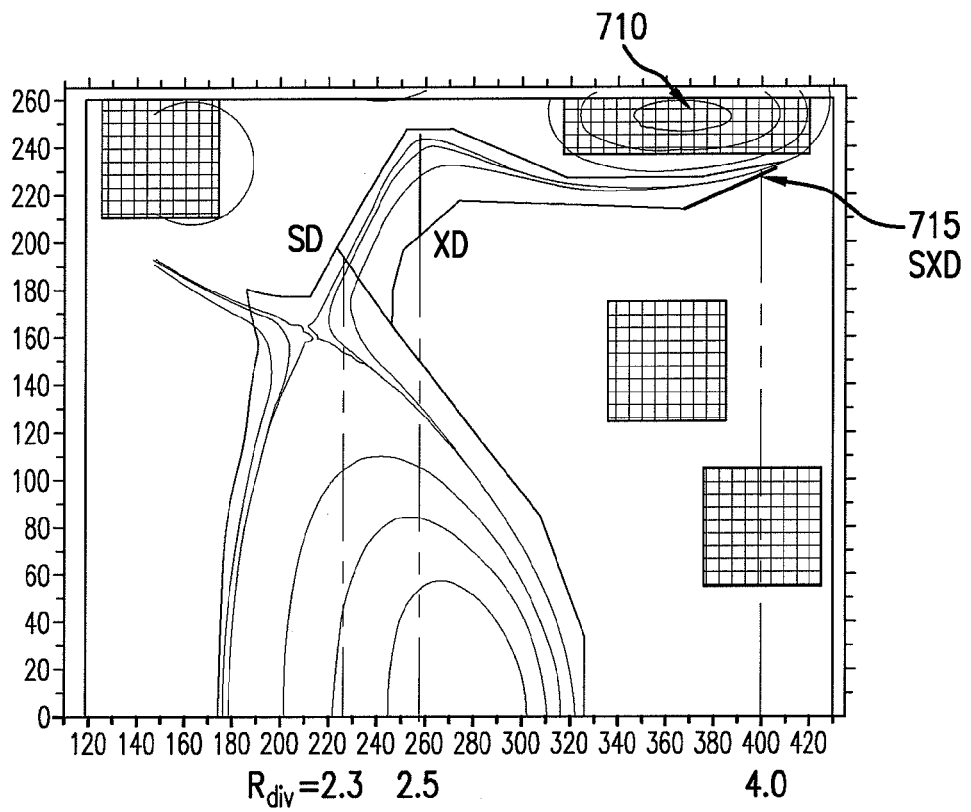
FIG. 9A shows an upper region of CORSICA TM equilibrium for an 9 exemplary embodiment.

CORSICA TM equilibrium for an exemplary design, are shown in FIG. 9A. With reference to FIG. 9A, an exemplary design can comprise one extra poloidal field (PF) coil or current-carrying conductor 710 which can be shielded in a toroidal field (TF) corner (i.e., a section near the toroidal field coils wherein neutron flux is substantially lower than a non-shielded section of the device). Such a device can comprise a fertile material substantially adjacent to the toroidal chamber.

Various parameters for this device are listed in Table 4. The listed B Angle in Table 4 is θ, or the angle between the divertor plate 715 and the total magnetic field, $B_{div}$. The B Length, is the magnetic distance, or the magnetic line length, as discussed hereinabove. $R_{div}$ is the divertor radius. Max area is the plasma wetted area on the divertor plate, as discussed hereinabove. The volume averaged temperature is represented by T in units of eV. The values for T listed in Table for are in reference to peak operation volume average temperatures. The results from Scrape-off layer plasma simulation calculations (SOLPS) are also presented.

With reference to Table 4 and FIG. 9A, various parameters for this embodiment are as follows: $R_{div}$=4.01 m, 1° Wet Area=5.6 m$^2$, B Length=61.8 m, B Length gain=4.0, MA-m ratio=1.62. As shown in FIG. 9A, both the standard divertor (SD) ($R_{div}$=2.3 m) and the X divertor (XD) ($R_{div}$=2.5 m) (see Kotschenreuther) have a smaller $R_{div}$ than the disclosed divertor plate 715 (SXD). For comparative examples, Table 4 lists various parameters for the three aforementioned divertor designs, including a presently disclosed design.

TABLE 4

Parameters for standard divertor (SD), X divertor (XD), and an embodiment of a disclosed divertor (SXD) for a reactor design.

| Div Plate | B Angle Degrees | B Length [m] | $R_{div}$ [m] | Max Area m$^2$ (at 1°) | T eV at Peak | SOLPS MW/m$^2$ |
|---|---|---|---|---|---|---|
| SD | 1.28 | 27.4 | 2.34 | 3.27 | 150 | 58 |
| XD | 0.93 | 39.7 | 2.51 | 3.51 | 150 | 28 |
| SXD | 1.2 | 61.6 | 4.01 | 5.61 | 10 | 18 |

For 5 mm wSOL at z = 0

Figure 9B:
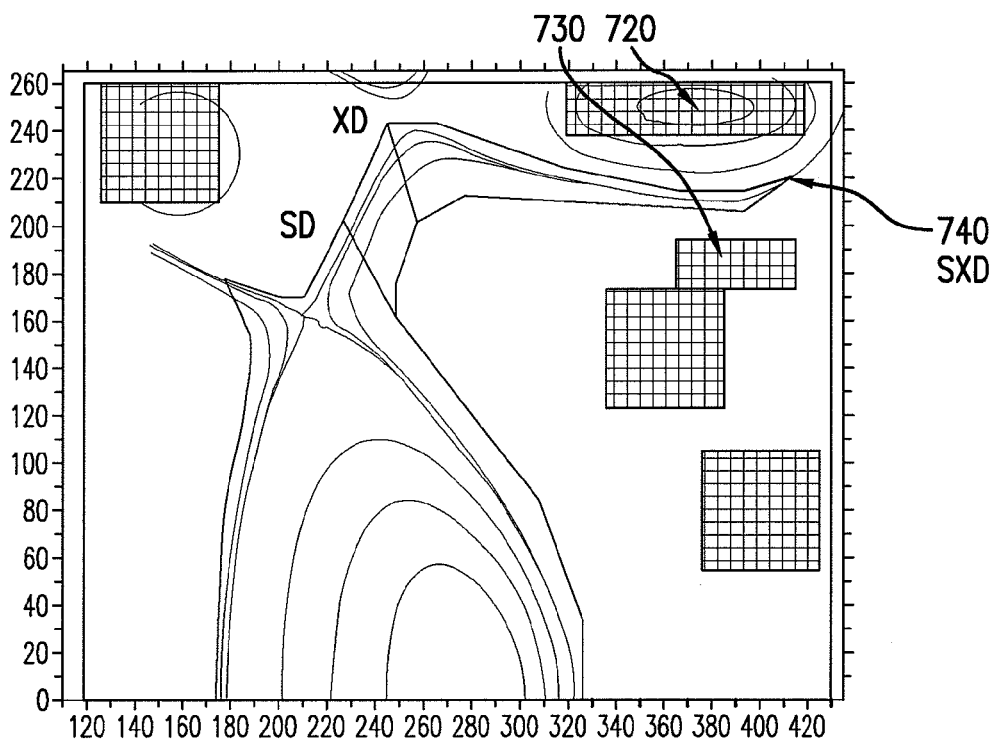
FIG. 9B shows an upper region of CORSICA TM equilibrium for an exemplary embodiment, wherein the divertor coil is split into two distinct divertor coils.

CORSICA TM equilibrium for yet another exemplary design are shown in FIG. 9B, wherein a design comprises a divertor plate with two additional PF coils (720 and 730). In this example, more flux expansion and greater line length can be achieved by splitting a single divertor coil into two separate divertor coils. Such a device can comprise a fertile material substantially adjacent to the toroidal chamber.

Various parameters for this device are listed in Table 5. The listed B Angle in Table 5 is θ, or the angle between the divertor plate 740 and the total magnetic field, $B_{div}$. The B Length, is the magnetic distance, or the magnetic line length, as discussed hereinabove. $R_{div}$ is the divertor radius. Max area is the plasma wetted area on the divertor plate, as discussed hereinabove. The volume averaged temperature is represented by T in units of eV. The values for T listed in Table for are in reference to peak operation volume average temperatures. The results from Scrape-off layer plasma simulation calculations (SOLPS) are also presented.

With reference to Table 5 and FIG. 9B, the parameters for this design are as follows: $R_{div}$=4.04 m 740, 1° Wet area=5.73 m$^2$, B Length=66.6 m, B Length gain=4.24, MA-m ratio=1.89. Table 5 show parameters for this exemplary split design, in comparison with a standard divertor (SD) and an X divertor (XD) (see Kotschenreuther).

TABLE 5

Parameters for standard divertor (SD), X divertor (XD), and an embodiment of a disclosed divertor 740 (SXD) for a reactor design

| Div Plate | B Angle Degrees | B Length [m] | $R_{div}$ [m] | Max Area m$^2$ (at 1°) | T eV at Peak | SOLPS MW/m$^2$ |
|---|---|---|---|---|---|---|
| SD | 1.14 | 28.0 | 2.33 | 3.30 | 150 | 58 |
| XD | 1.07 | 42.0 | 2.51 | 3.56 | 150 | 28 |
| SXD | 1.00 | 66.6 | 4.04 | 5.73 | <8 | <18 |

For 5 mm wSOL at z = 0

Figure 9C:
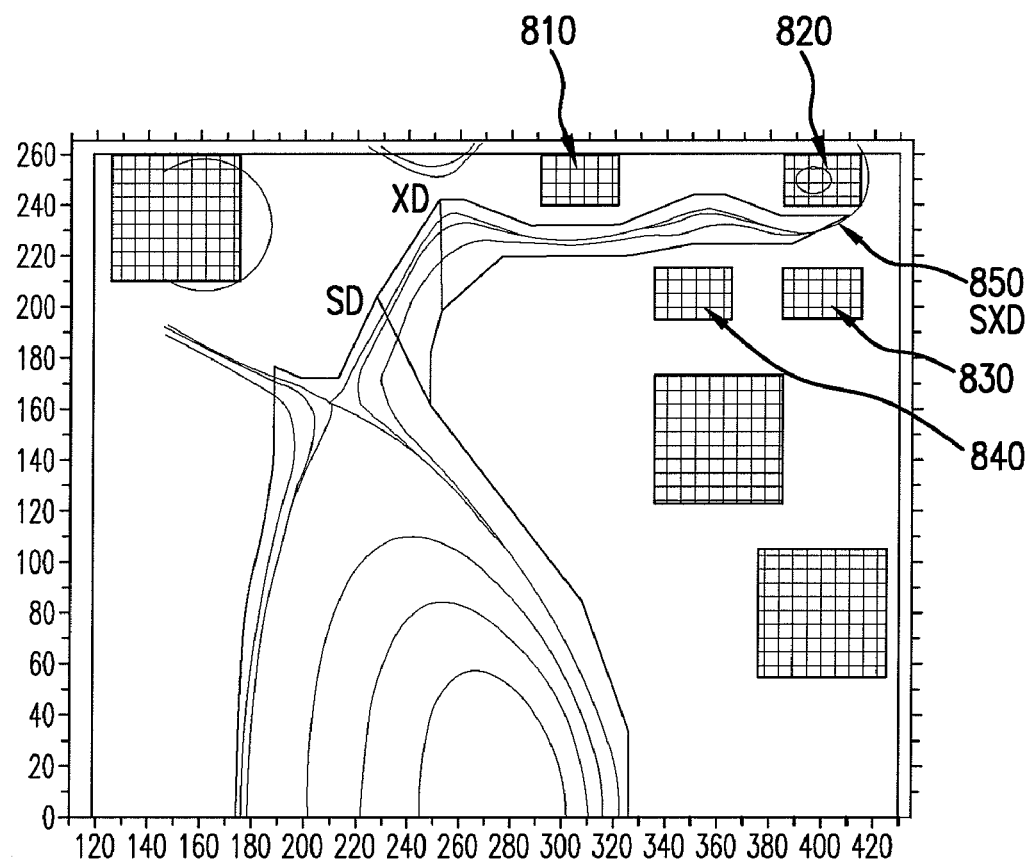
FIG. 9C shows an upper region of CORSICA TM equilibrium for an exemplary embodiment, wherein the divertor coil is split into four distinct divertor coils.

CORSICA TM equilibrium for another exemplary design are shown in FIG. 9C, wherein there are four extra PF coils 810, 820, 830, and 840 (wherein 1 coil is split into 4 coils). Such a device can comprise a fertile material substantially adjacent to the toroidal chamber.

Various parameters for this device are listed in Table 4. The listed B Angle in Table 4 is θ, or the angle between the divertor plate 850 and the total magnetic field, $B_{div}$. The B Length, is the magnetic distance, or the magnetic line length, as discussed hereinabove. $R_{div}$ is the divertor radius. Max area is the plasma wetted area on the divertor plate, as discussed hereinabove. The volume averaged temperature is represented by T in units of eV. The values for T listed in Table for are in reference to peak operation volume average temperatures. The results from Scrape-off layer plasma simulation calculations (SOLPS) are also presented.

With reference to Table 6 and FIG. 9C, the parameters for this design are as follows: $R_{div}$=3.95 m 850, 1° Wet area=5.57 m², B Length=73.6, B Length gain=4.69, MA-m ratio=1.72. It is also apparent that more B length can be obtained by changing coil locations. It will be apparent that the location of the PF coils can direct and/or shape the SOL to the divertor plate, and thereby expand or reduce the particle flux (heat flux) coming from the SOL.

TABLE 6

Parameters for standard divertor, X divertor, and a disclosed divertor (split into four divertors) for a reactor design

| Div Plate | B Angle Degrees | B Length [m] | $R_{div}$ [m] | Max Area m² (at 1°) | T eV at Peak | SOLPS MW/m² |
|---|---|---|---|---|---|---|
| SD | 1.18 | 27.8 | 2.34 | 3.30 | 150 | 58 |
| XD | 0.92 | 40.3 | 2.51 | 3.54 | 150 | 28 |
| SXD | 1.0 | 73.6 | 3.95 | 5.57 | <5 | <18 |

For 5 mm wSOL at z = 0

Figure 10:
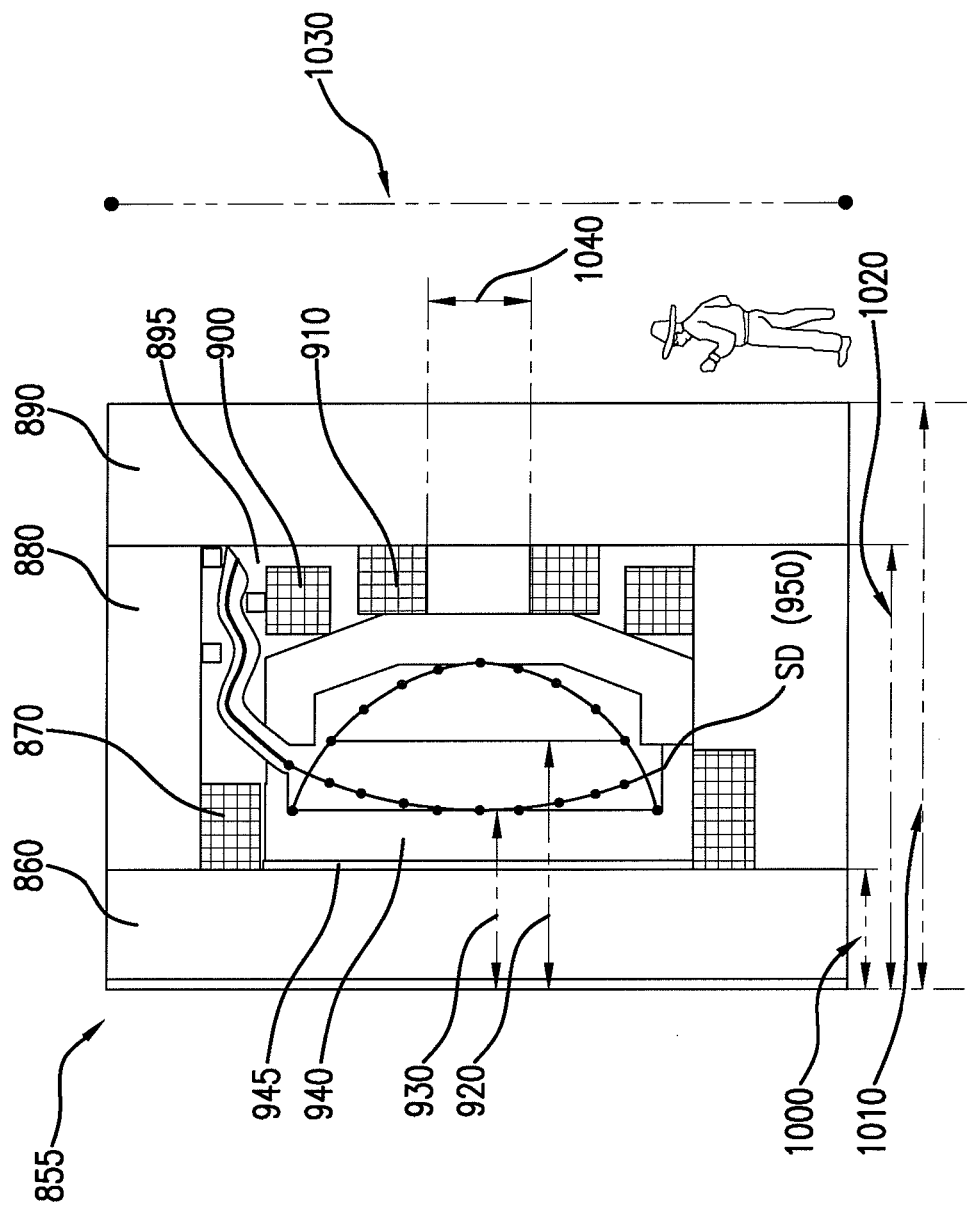
FIG. 10 shows an exemplary diagram of a Fusion Development Facility (FDF) based embodiment for a disclosed FDF based reactor.

FIG. 10 shows, for example, a cross section of an exemplary fusion reactor 855 with a vertical height of about 7.15 m (1030) comprising components that can be used in a disclosed embodiment. Such a device can comprise a fertile material substantially adjacent to the toroidal chamber.

In this example, ohmic heating coils (OHCs) 945 are used to produce and/or heat the confined plasma, with a major plasma radius 920 of about 2.49 m, and with minor plasma radius of about 1.42 m. Extending from the central axis with a radius of about 1.78 m (930), is a blanket (i.e., the chamber walls) 940 that substantially encloses the plasma. The blanket shown is about 0.5 m thick.

The toroidal field (TF) center post 860 lies adjacent to the central axis, with a radius of about 1.2 m (1000), which is in physical communication with a TF wedge 880, the farthest radius of which extends about 4.35 m (1020) connected to TF outer verticals 890, the farthest radius of which extends about 5.72 m (1010). Exemplary poloidal field (PF) coils, 870, 900, and 910 inside the perimeter of the toroidal field, are positioned substantially adjacent to the fusion plasma. The distance 1040 between the two outermost (i.e., farthest away from the central axis) PF coils is about 1.0 m.

In this embodiment, a disclosed divertor plate 895 is shown substantially adjacent to a poloidal field coil 900. In the exemplary fusion reactor of FIG. 10, a standard divertor plate (SD) 950, as is known in the art, is shown in comparison to a disclosed divertor (SXD) 895. A standard divertor plate 950 configuration as shown in FIG. 10 can be used in combination with a disclosed divertor plate 895 configuration. It should be noted that the dimensions shown in FIG. 10 are exemplary in nature and variance of the dimensions or design of the fusion reactor is contemplated to be within the scope of various embodiments of the invention.

3. Modified Design of Future Machines

Figure 11:
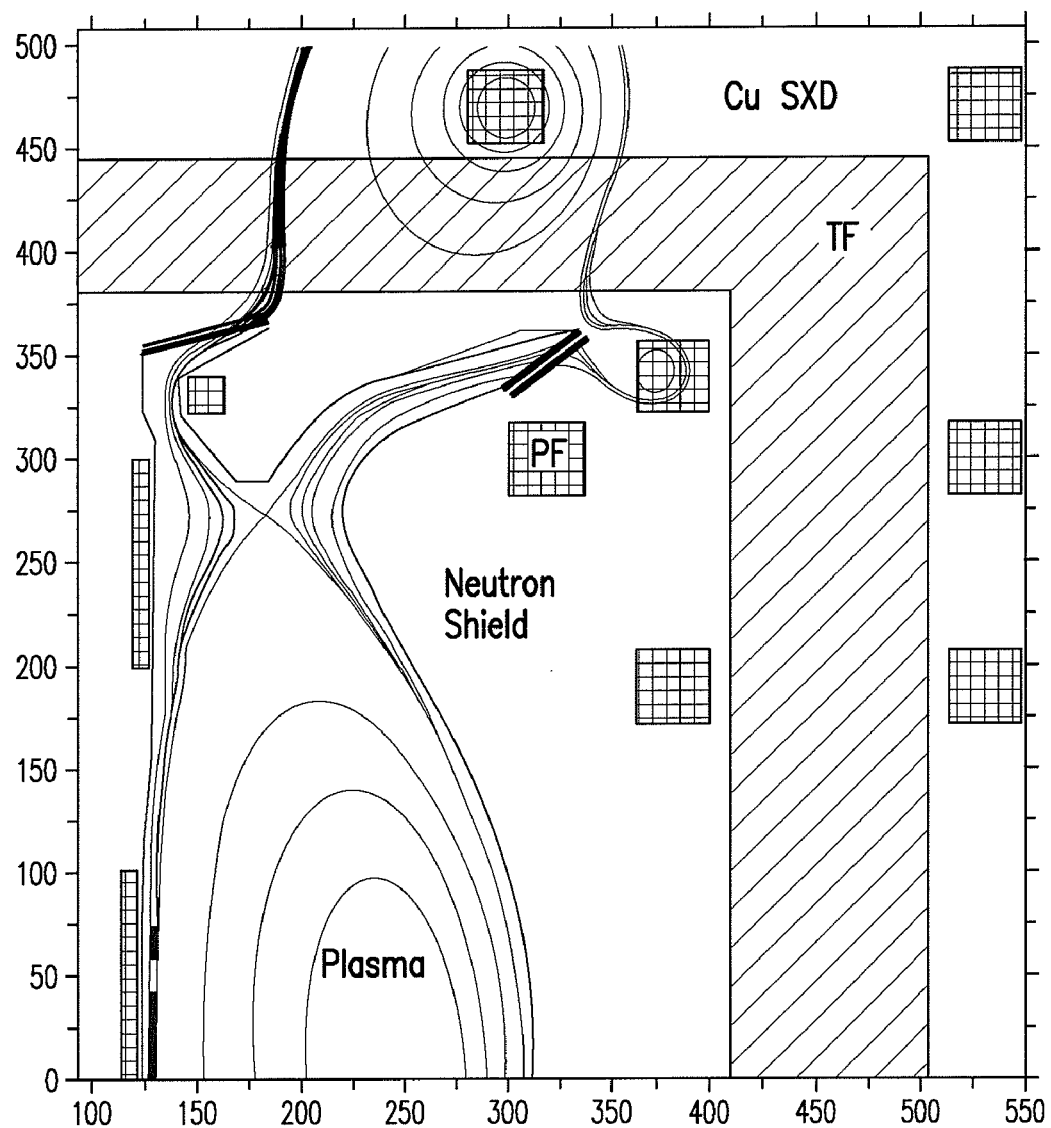
FIG. 11 shows an upper region of CORSICA TM equilibrium for an exemplary embodiment for a Component Test Facility (CTF) with Cu coils.
Figure 12:
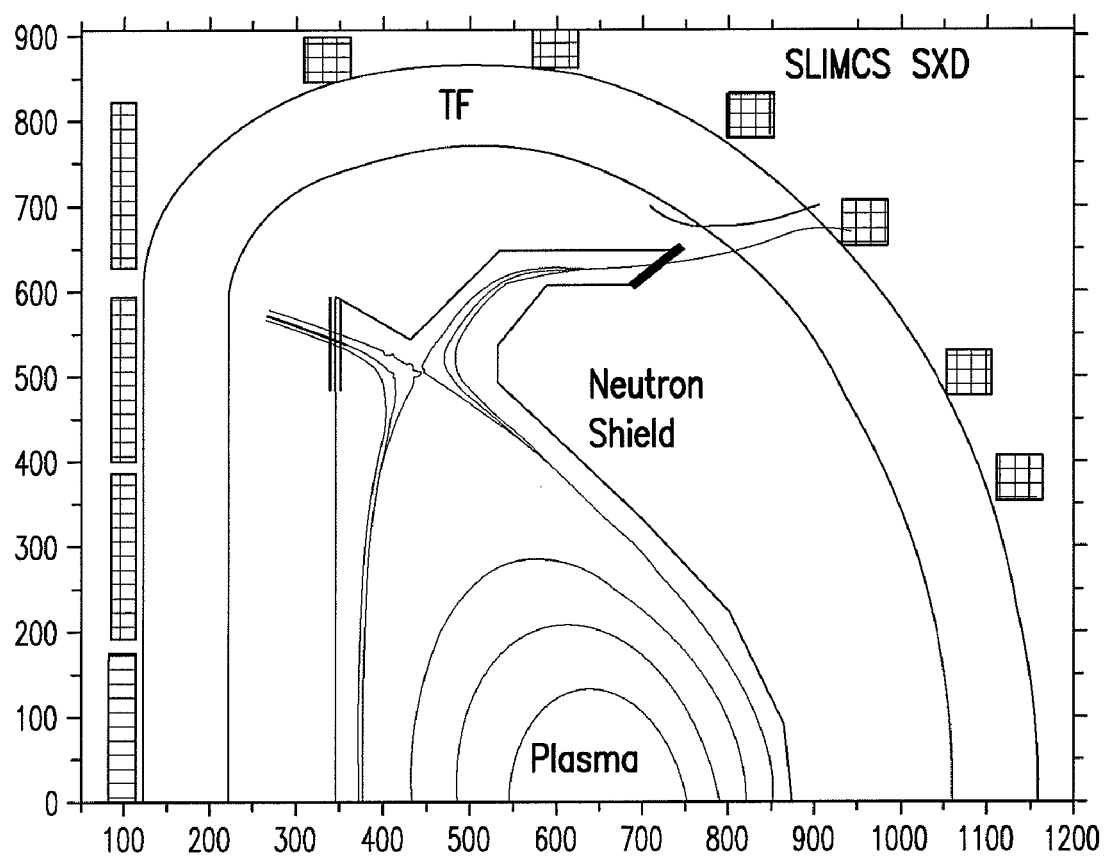
FIG. 12 shows an upper region of CORSICA TM equilibrium for an exemplary embodiment for a Slim-CS, a reduced size central solenoid (CS) based reactor with superconducting coils.
Figure 13:
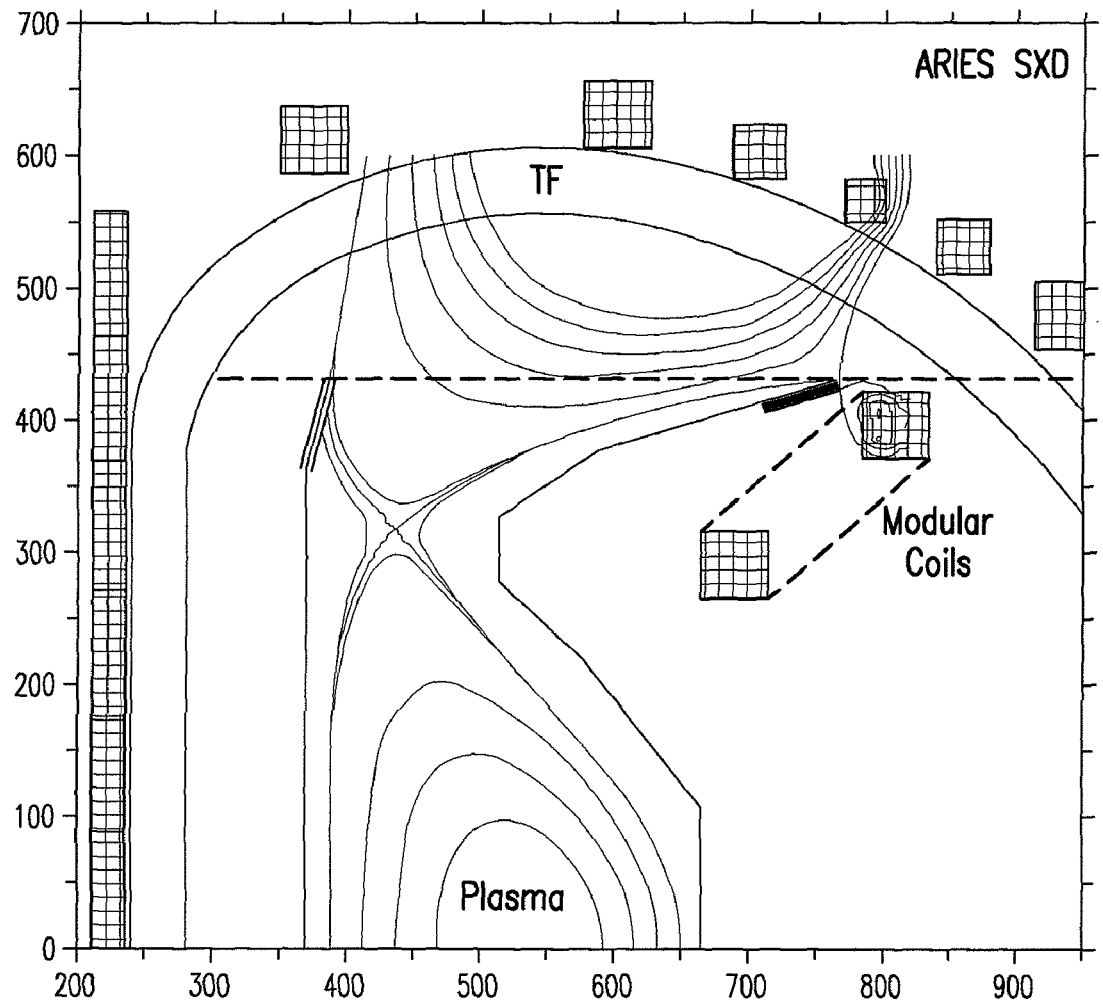
FIG. 13 shows upper region of CORSICA TM equilibrium for an exemplary embodiment for an ARIES (Advanced Reactor Innovation and Evaluation Study) based reactor (using modular coils that fit inside the extractable sections bounded by the dotted line)
Figure 14A:
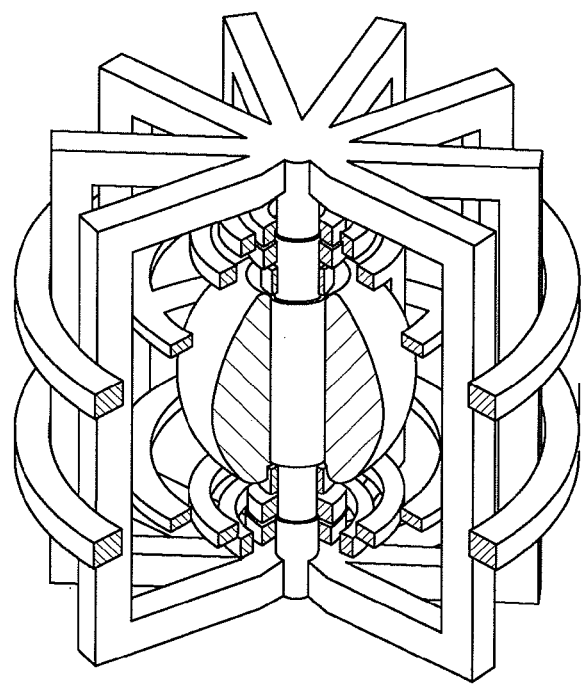
FIGS. 14A & 14B shows (a) a diagram of National High-power Advanced Torus Experiment (NHTX) based embodiment and (b) CORSICA TM equilibrium for a disclosed NHTX based reactor.
Figure 14B:
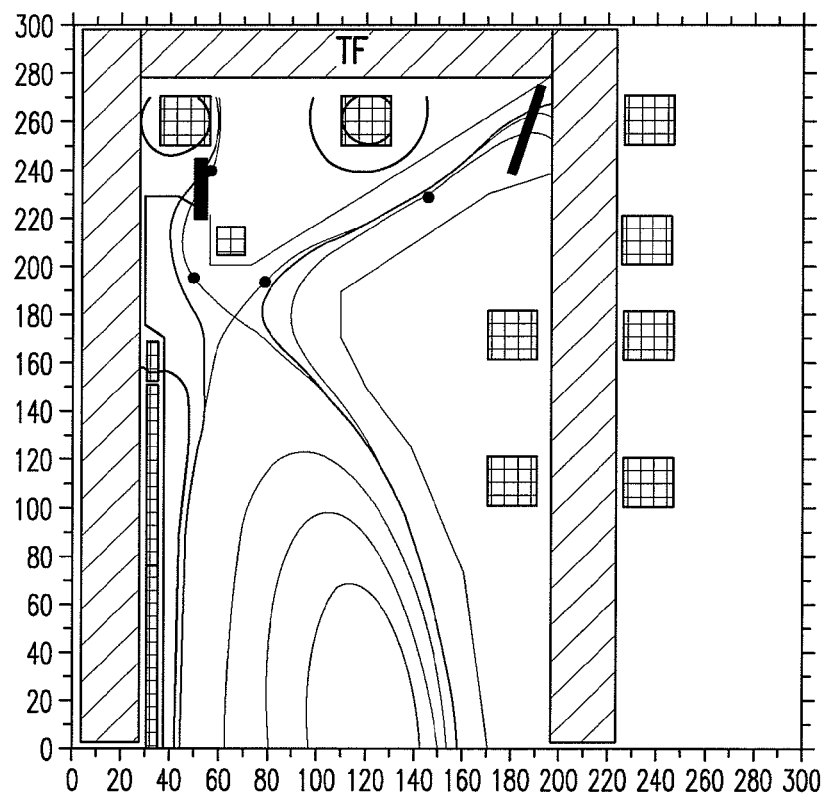
Figure 15C:
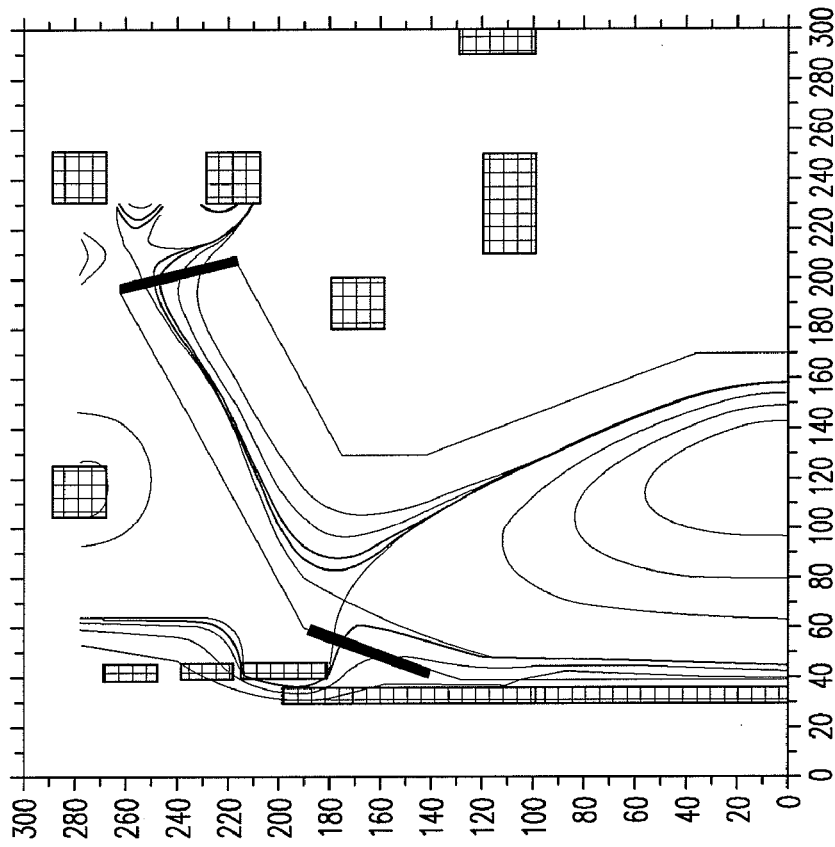
FIG. 15C shows upper region of CORSICA TM equilibrium for a disclosed NHTX based embodiment.
Figure 15B:
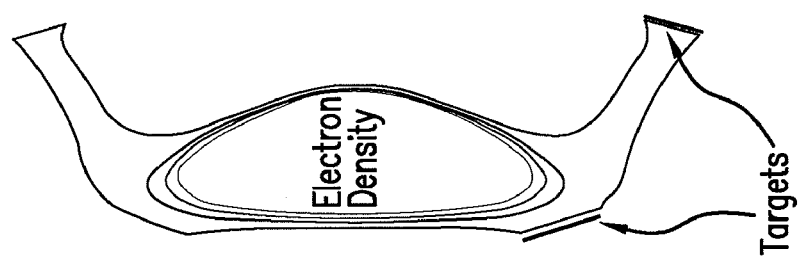
FIG. 15B shows a SOLPS (Scrape-off Layer Plasma Simulation) calculation for an NHTX based reactor comprising an embodiment of a disclosed divertor configuration.
Figure 15A:
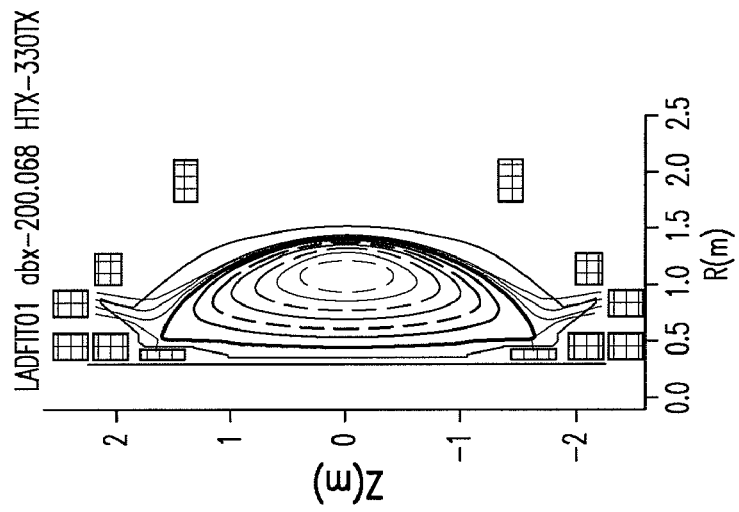
FIG. 15A shows a standard NHTX configuration (prior art)
Figure 16:
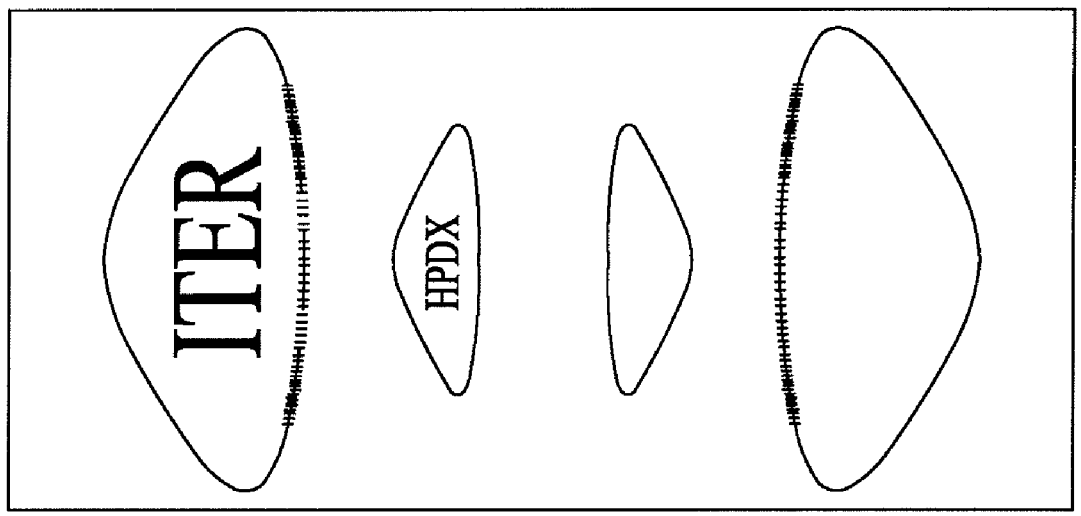
FIG. 16 shows a cross-section plot of ITER (International Thermonuclear Experimental Reactor) plasma size compared to high power density plasma sizes achievable using embodiments described herein.

Using CORSICA TM (J. A. Crotinger, L. L. LoDestro, L. D. Pearlstein, A. Tarditi, T. A. Casper, E. B. Hooper, LLNL Report UCRLID-126284, 1997 available from NTIS PB2005-102154), MHD (magnetohydrodynamic) equilibrium can be generated for various future machine types, as presented herein. The results of a calculation for a Cu high power density reactor are shown in FIG. 11. The results of a calculation for a superconducting (SC) SLIM-CS reactor with small radial build for TF (assuming remote handling ability) are shown in FIG. 12. The results of a calculation for an ARIES-AT reactor (also SC) with radially large TF coils are shown in FIG. 13. For the ARIES design, it is apparent that an embodiment of a disclosed divertor design can be used wherein poloidal field (PF) coils are outside toroidal field (TF) coils. The design shown in FIG. 13, however, uses modular SC (superconducting) divertor coils that fit inside unused volume in the reactor, thereby enabling larger radial divertor extension. For the configurations in FIGS. 11, 10, and 11, the gains in $R_{div}/R_{sol}$ are 2, 1.7, and 2, respectively, while the line length goes up (over a standard divertor, discussed in more detail in Kotschenreuther) by factors of 5, 3, and 4, respectively. Such a device can comprise a fertile material substantially adjacent to the toroidal chamber.

It should be appreciated that, through experimentation with CORSICA TM equilibrium, a wide variety of plasma shapes (aspect ratios, elongations, triangularities, as defined hereinabove, etc.) can be accommodated with a disclosed embodiment. In some aspects, it is possible to modify the design of an existing or future reactor from a standard divertor design, to a disclosed divertor design with a small change in the number of coils and net applied power, while keeping the core geometry substantially unaffected. Thus, in one aspect, a disclosed divertor design can be applied to a known reactor configuration.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Although several aspects of the present invention have been disclosed in the specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims which follow, they are used only in a generic and descriptive sense, and not for the purposes of limiting the described invention.

What is claimed is:

1. A tokamak based reactor for breeding nuclear fuel from fertile material or transmutation of nuclear waste by-products of a nuclear fuel cycle, comprising:
   (a) a tokamak device device comprising:
       (1) a first toroidal chamber enclosed by walls and forming a torus about a central axis;

(2) a plurality of current-carrying conductors adjacent to the first toroidal chamber and configured to produce:
  i) a magnetic field, wherein the magnetic field is comprised of closed magnetic surfaces and open magnetic field lines surrounding the closed magnetic surfaces, said closed magnetic surfaces defining a core region capable of confining a core plasma having an elongation of from 1.5 to 4 in a direction along the central axis, with the core plasma having an equatorial plane, plasma major radii and plasma minor radii,
  ii) a separatrix that forms a boundary between the open magnetic field lines and the closed magnetic surfaces, and
  iii) at least one stagnation point on the separatrix, wherein the at least one stagnation point is at a distance from the equatorial plane of the core plasma that is greater than the plasma minor radius; and
(3) at least one outboard divertor plate within the first toroidal chamber at a location that intersects a portion of the open magnetic field lines produced by the current carrying conductors, wherein
the at least one outboard divertor plate and current carrying conductors are further configured relative to one another such that the current carrying conductors expand the open magnetic field lines at the at least one outboard divertor plate; and
the at least one outboard divertor plate is further configured within the first toroidal chamber to have an outboard major divertor radius that is greater than a sum of the plasma minor radius and the plasma major radius of a peak point of the core plasma that is closest to the at least one outboard divertor plate; and
(b) a second chamber adjacent to the first toroidal chamber for housing the fertile material or waste by-products of a nuclear fuel cycle.

2. The tokamak based reactor of claim 1, wherein the at least one outboard divertor is positioned in a double null configuration.

3. The tokamak based reactor of claim 1, wherein the plurality of current carrying conductors includes a poloidal field coil that is shielded and located in a toroidal field corner of the first toroidal chamber.

4. The tokamak based reactor of claim 1, wherein at least one of the plurality of current carrying conductors is a poloidal field coil and the at least one outboard divertor is adjacent to the poloidal field coil.

5. The tokamak based reactor of claim 1, wherein the plurality of current carrying conductors is comprised of toroidal and poloidal field coils.

6. The tokamak based reactor of claim 1, wherein the second chamber is surrounded by a Pb comprising section that insulates against neutrons.

\* \* \* \* \*